United States Patent
Hitomi et al.

(10) Patent No.: US 9,522,519 B2
(45) Date of Patent: Dec. 20, 2016

(54) POLYCARBONATE RESIN LAMINATE

(71) Applicants: MITSUBISHI CHEMICAL CORPORATION, Chiyoda-ku (JP); MITSUBISHI ENGINEERING-PLASTICS CORPORATION, Minato-ku (JP)

(72) Inventors: Tatsuya Hitomi, Kitakyushu (JP); Ryouhei Nishihara, Hiratsuka (JP); Kiyotaka Hirano, Yokkaichi (JP); Yoshitaka Shiraishi, Kitakyushu (JP); Masanori Yamamoto, Kitakyushu (JP); Tomonari Yokoyama, Hiratsuka (JP); Masahide Shidou, Yokkaichi (JP)

(73) Assignees: Mitsubishi Chemical Corporation, Chiyoda-ku (JP); Mitsubishi Engineering-Plastics Corporation, Minato-ku (JP)

( * ) Notice: Subject to any disclaimer, the term of this patent is extended or adjusted under 35 U.S.C. 154(b) by 354 days.

(21) Appl. No.: 14/170,995

(22) Filed: Feb. 3, 2014

(65) Prior Publication Data

US 2014/0147651 A1    May 29, 2014

Related U.S. Application Data

(63) Continuation of application No. PCT/JP2012/069604, filed on Aug. 1, 2012.

(30) Foreign Application Priority Data

Aug. 1, 2011 (JP) .................. 2011-168506
Feb. 22, 2012 (JP) .................. 2012-036053
Apr. 26, 2012 (JP) .................. 2012-101700
Apr. 26, 2012 (JP) .................. 2012-101701
Apr. 26, 2012 (JP) .................. 2012-101702

(51) Int. Cl.
B32B 27/36 (2006.01)
C08G 64/06 (2006.01)
C08L 69/00 (2006.01)
B32B 7/02 (2006.01)
B32B 7/12 (2006.01)
(Continued)

(52) U.S. Cl.
CPC .............. *B32B 27/365* (2013.01); *B32B 7/02* (2013.01); *B32B 7/12* (2013.01); *B32B 27/08* (2013.01); *B32B 27/18* (2013.01); *C08G 64/06* (2013.01); *C08L 69/00* (2013.01); *B32B 2250/244* (2013.01); *B32B 2272/00* (2013.01); *B32B 2307/536* (2013.01); *B32B 2307/558* (2013.01); *B32B 2457/20* (2013.01); *B32B 2457/208* (2013.01); *B32B 2571/00* (2013.01); *C08L 2205/02* (2013.01); *Y10T 428/31507* (2015.04)

(58) Field of Classification Search
None
See application file for complete search history.

(56) References Cited

U.S. PATENT DOCUMENTS 3,153,008 A * 10/1964 Fox .................. C08G 64/06
273/DIG. 1
6,043,194 A * 3/2000 Saito ................ B41M 7/0027
428/32.87
2003/0060593 A1    3/2003 Funakoshi et al.
(Continued)

FOREIGN PATENT DOCUMENTS

CN    101786361 A *  7/2010 ............ B32B 27/36
JP    64-69625       3/1989
(Continued)

OTHER PUBLICATIONS

Awano et al. (CN 101786361 A); Jul. 28, 2010; (Google Patents—English Machine Translation).*
(Continued)

*Primary Examiner* — David Sample
*Assistant Examiner* — Donald M Flores, Jr.
(74) *Attorney, Agent, or Firm* — Oblon, McClelland, Maier & Neustadt, L.L.P.

(57) ABSTRACT

To provide a polycarbonate resin laminate having the surface hardness remarkably improved and being excellent in color and impact resistance. A polycarbonate resin laminate which comprises at least a surface layer (A) and a resin layer (B) and is characterized by satisfying the following conditions:

(i) the surface layer (A) is a layer made of a polycarbonate resin composition which comprises at least a polycarbonate resin (a) having at least structural units represented by the following formula (1) and a polycarbonate resin (b) having structural units different from the polycarbonate resin (a), (ii) the mass ratio of the polycarbonate resin (a) to the polycarbonate resin (b) in the surface layer (A) is within a range of from 45:55 to 99:1, and (iii) the pencil hardness of the polycarbonate resin laminate as specified by ISO 15184 and measured from the surface layer (A) side is at least H:

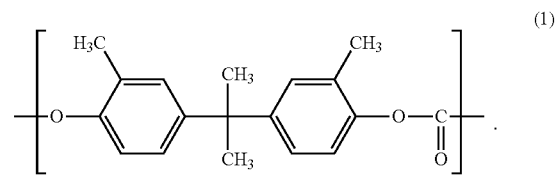

16 Claims, No Drawings

(51) Int. Cl.
*B32B 27/08* (2006.01)
*B32B 27/18* (2006.01)

(56) References Cited

U.S. PATENT DOCUMENTS

| | | | |
|---|---|---|---|
| 2007/0257401 A1* | 11/2007 | Nakagawa | C08L 69/00 264/328.1 |
| 2008/0254299 A1 | 10/2008 | Blackburn et al. | |
| 2013/0030112 A1 | 1/2013 | Hitomi et al. | |
| 2013/0030113 A1 | 1/2013 | Hitomi et al. | |
| 2014/0018498 A1 | 1/2014 | Hitomi et al. | |
| 2015/0018510 A1 | 1/2015 | Shidou et al. | |

FOREIGN PATENT DOCUMENTS

| | | |
|---|---|---|
| JP | 8-183852 | 7/1996 |
| JP | 2002-363398 A | 12/2002 |
| JP | 2003-119369 A | 4/2003 |
| JP | 2003-535948 | 12/2003 |
| JP | 2006-111713 A | 4/2006 |
| JP | 2006-154783 A | 6/2006 |
| JP | 2010-126594 | 6/2010 |
| JP | 2010-188719 | 9/2010 |
| JP | 2011-88402 | 5/2011 |
| JP | 2011-89049 | 5/2011 |
| JP | 2011-105931 | 6/2011 |
| WO | WO 02/22708 A1 | 3/2002 |
| WO | WO 2009/083933 A1 | 7/2009 |

OTHER PUBLICATIONS

International Search Report issued Oct. 2, 2012 in PCT/JP2012/069604 filed Aug. 1, 2012.
Combined Chinese Office Action and Search Report issued Jan. 16, 2015 in Patent Application No. 201280036802.7 (with English Translation).
The Extended European Search Report issued Apr. 30, 2014, in Application No. / Patent No. 12820813.9-1303 PCT/JP2012069604.
Office Action issued Sep. 1, 2015 in Japanese Patent Application No. 2012-101700 (with English language translation).
Office Action issued Sep. 1, 2015 in Japanese Patent Application No. 2012-101701 (with English language translation).
Office Action issued Sep. 1, 2015 in Japanese Patent Application No. 2012-101702 (with English language translation).
Office Action as received in the corresponding Japanese Patent Application No. 2012-171367 dated Apr. 22, 2016 w/English translation.
Third Party Submission Information Statement issued May 10, 2016 in Japanese Patent Application No. 2012-171367 (with English language translation).

* cited by examiner

POLYCARBONATE RESIN LAMINATE

TECHNICAL FIELD

The present invention relates to a polycarbonate resin laminate which is excellent in surface hardness and also excellent in color and in impact resistance.

BACKGROUND ART

A polycarbonate resin is excellent in mechanical properties such as impact resistance, electrical properties, heat resistance, moldability, transparency, etc., and is widely used for various components for various display devices, interior components for automobiles or components for protective equipments.

In such applications, in a case where a lightweight transparent structural element is required, a sheet using a polycarbonate resin is commonly employed, and in such a case, it is frequently made into a multilayer sheet or subjected to additional treatment such as hard coat treatment.

Patent Document 1 discloses a single layer sheet of a polycarbonate resin having a 2,2-bis(4-hydroxy-3-methylphenyl)propane structure. This polycarbonate resin sheet has high surface hardness i.e. the surface hardness is 2H as pencil hardness, but the color of the sheet is poor and yellowish, and therefore, it is not useful for an application where the color is important. Further, the impact resistance is also poor.

Further, Patent Document 2 discloses a laminate sheet using, as a surface layer, a polycarbonate resin layer having a 2,2-bis(4-hydroxy-3-methylphenyl)propane structure and, as a core layer, a polycarbonate resin layer having a 2,2-bis(4-hydroxyphenyl)propane (i.e. bisphenol A) structure. In Patent Document 2, the polycarbonate resin of the bisphenol A structure has a pencil hardness of 2B and its surface is susceptible to scratching, and therefore, the surface hardness is improved by forming a laminate having a surface layer with high surface hardness provided on such a core layer. However, this laminate is poor in impact resistance, although its surface hardness is high.

Patent Document 3 discloses a polycarbonate resin laminate using, as a surface layer, a polycarbonate resin layer having a pencil hardness of at least HB and, as a core layer, a polycarbonate resin layer having a bisphenol A structure, and further having the surface layer covered with a hard coating. However, the impact resistance is inadequate, and besides, this laminate essentially requires the hard coating.

Further, Patent Document 4 discloses a sheet of a polycarbonate resin obtained by copolymerizing cyclododecane biscresol and bisphenol A, as a polycarbonate resin sheet having high surface hardness. Although the surface hardness is high, the impact resistance was inadequate.

PRIOR ART DOCUMENTS

Patent Documents

Patent Document 1: JP-A-64-69625
Patent Document 2: JP-A-2010-188719
Patent Document 3: JP-A-2011-88402
Patent Document 4: JP-A-2010-126594

DISCLOSURE OF INVENTION

Technical Problem

Among applications of a polycarbonate resin, in applications for e.g. components for display devices, covers for display devices, components of protective equipments, in-vehicle components, etc., it is required that the surface hardness is high, the color is good, and the impact resistance is excellent. However, heretofore, a polycarbonate resin sheet or a polycarbonate resin laminate having high surface hardness and being excellent in color and impact resistance has not been known irrespective of the thickness of the sheet.

It is an object of the present invention to provide a polycarbonate resin laminate which has high surface hardness and is excellent in color and impact resistance.

Solution to Problem

The present inventors have conducted an extensive research to accomplish the above object and as a result have found that a laminate which comprises a surface resin layer made of plural specific polycarbonate resins and a resin layer made of a single or plural polycarbonate resins and which satisfies specific layer thicknesses and specific surface hardness, is useful in order to accomplish the above object. The present invention has been accomplished on the basis of such a discovery.

The present invention has the following characteristics.

[1] A polycarbonate resin laminate which comprises at least a surface layer (A) and a resin layer (B) and is characterized by satisfying the following conditions:

(i) the surface layer (A) is a layer made of a polycarbonate resin composition which comprises at least a polycarbonate resin (a) having at least structural units represented by the following formula (1) and a polycarbonate resin (b) having structural units different from the polycarbonate resin (a), (ii) the mass ratio of the polycarbonate resin (a) to the polycarbonate resin (b) in the surface layer (A) is within a range of from 45:55 to 99:1, and (iii) the pencil hardness of the polycarbonate resin laminate as specified by ISO 15184 and measured from the surface layer (A) side is at least H:

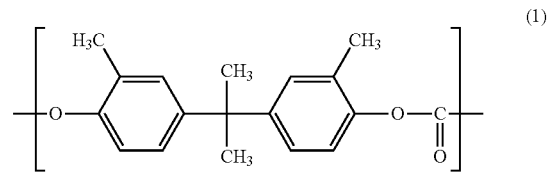

[2] The polycarbonate resin laminate according to [1], wherein the polycarbonate resin (b) has at least structural units represented by the following formula (2):

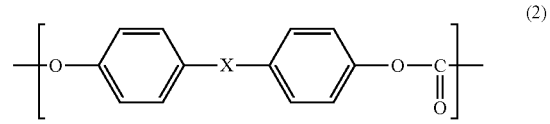

in the formula (2), X represents

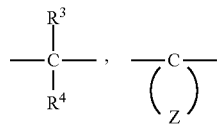

wherein each of R³ and R⁴ which are independent of each other, is a hydrogen atom or a methyl group, and Z is a group forming, as bonded to C, a $C_{6-12}$ alicyclic hydrocarbon which may have a substituent.

[3] The polycarbonate resin laminate according to [1] or [2], wherein the resin layer (B) is made of a polycarbonate resin composition which contains at least the polycarbonate resin (b).

[4] The polycarbonate resin laminate according to [3], wherein the resin layer (B) is made of a polycarbonate resin composition which further contains the polycarbonate resin (a), and in the resin layer (B), the proportion of the polycarbonate resin (a) is from 30 to 1 mass %, and the proportion of the polycarbonate resin (b) is from 70 to 99 mass %.

[5] The polycarbonate resin laminate according to any one of [1] to [4], wherein the polycarbonate resin (a) contains structural units derived from a compound represented by the following formula (8), and the content of such structural units is at least 20 ppm and at most 1,000 ppm:

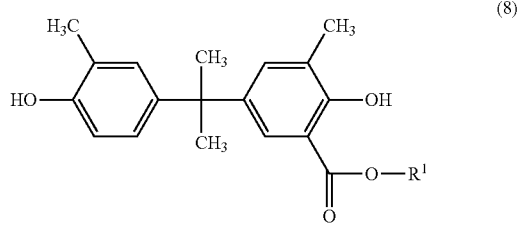

(8)

in the formula (8), R¹ is a hydrogen atom or a methyl group.

[6] The polycarbonate resin laminate according to any one of [1] to [5], wherein the content of the structural units derived from the compound represented by the formula (8) in the polycarbonate resin laminate is from 0.05 to 1,000 ppm.

[7] The polycarbonate resin laminate according to any one of [1] to [6], wherein the polycarbonate resin (a) contains structural units derived from a compound represented by the following formula (9), and the content of such structural units is at least 10 ppm and at most 3,500 ppm:

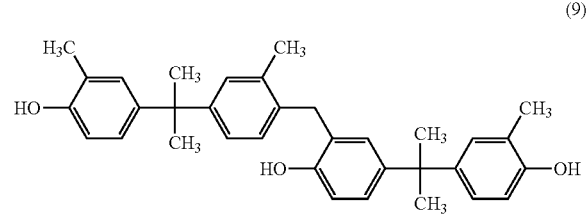

(9)

[8] The polycarbonate resin laminate according to any one of [1] to [7], wherein the content of the structural units derived from the compound represented by the formula (9) in the polycarbonate resin laminate is from 0.02 to 3,500 ppm.

[9] The polycarbonate resin laminate according to any one of [1] to [8], wherein the polycarbonate resin (a) contains structural units derived from a compound represented by the following formula (10), and the content of such structural units is at least 40 ppm and at most 600 ppm:

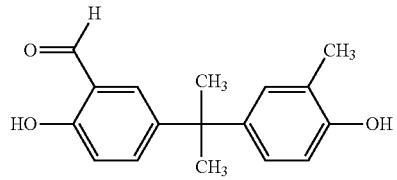

(10)

[10] The polycarbonate resin laminate according to any one of [1] to [9], wherein the content of the structural units derived from the compound represented by the formula (10) in the polycarbonate resin laminate is from 0.1 to 600 ppm.

[11] The polycarbonate resin laminate according to any one of [1] to [10], wherein the thickness of the polycarbonate resin laminate is from 200 to 5,000 µm.

[12] The polycarbonate resin laminate according to any one of [1] to [11], wherein the thickness of the surface layer (A) is from 20 to 1,000 µm, and the thickness of the resin layer (B) is from 10 to 5,000 µm.

[13] The polycarbonate resin laminate according to any one of [1] to [12], wherein the yellowness index is at most 10 when a 7 mass % solution of the polycarbonate resin laminate in methylene chloride is measured in an optical path length of 50 mm.

[14] The polycarbonate resin laminate according to any one of [1] to [13], wherein the polycarbonate resin composition constituting the surface layer (A) and/or the resin layer (B) contains at least one stabilizer selected from the group consisting of a phosphorus type stabilizer, a phenol type stabilizer and a sulfur type stabilizer in an amount of from 0.01 to 1 part by mass.

[15] The polycarbonate resin laminate according to [14], wherein the stabilizer is a phenol type stabilizer.

[16] A protective window material for a portable display device, a component for a display device, a cover for a display device, a component for a protective equipment or an in-vehicle component made of the polycarbonate resin laminate as defined in any one of [1] to [15].

Advantageous Effects of Invention

The polycarbonate resin laminate of the present invention is excellent in surface hardness and good in color and is excellent also in impact resistance, and therefore, it is useful particularly for components for display devices, covers for display devices, components for protective equipments, in-vehicle components, etc. It is therefore useful for an application in which the surface hardness is particularly required, such as for protective window material for portable display devices.

DESCRIPTION OF EMBODIMENTS

[Surface Layer (A)]

The surface layer (A) in the polycarbonate resin laminate of the present invention has a large area in contact with the exterior, and its color and hardness are highly likely to determine the superiority of the product quality.

The surface layer (A) is a layer made of a polycarbonate resin composition which comprises at least a polycarbonate resin (a) having at least structural units represented by the formula (1) and a polycarbonate resin (b) having structural units different from the polycarbonate resin (a):

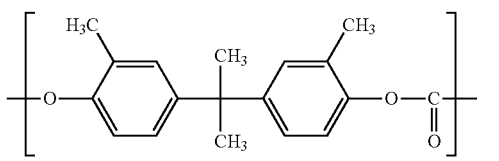

(1)

As it contains the polycarbonate resin (a), the surface layer (A) becomes to have high surface hardness, to be excellent in color and further to be excellent also in impact resistance. As the polycarbonate resin (a), one type may be used alone, or two or more types different in the raw material dihydroxy compound, the production method, the viscosity average molecular weight, etc. may be used in combination as mixed.

In the surface layer (A), the mass ratio of the constituting portion of the polycarbonate resin (a) having at least structural units represented by the formula (1) to the constituting portion of the polycarbonate resin (b) having structural units different from the polycarbonate resin (a) is within a range of from 45:55 to 99:1, preferably from 50:50 to 95:5, more preferably from 55:45 to 90:10, further preferably from 60:40 to 85:15.

The structural units contained in the polycarbonate resin (b) in the surface layer (A) are preferably represented by the following formula (2):

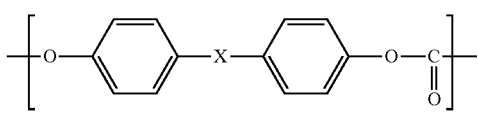

(2)

In the formula (2), X is the following group:

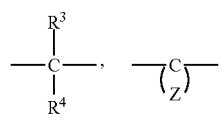

Each of $R^3$ and $R^4$ which are independent of each other is a hydrogen atom or a methyl group, and Z is a group forming, as bonded to C, a $C_{6-12}$ alicyclic hydrocarbon which may have a substituent.

In a case where X in the above formula (2) is the following group:

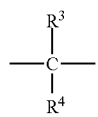

it is preferably an isopropylidene group wherein both $R^3$ and $R^4$ are methyl groups.

In a case where X in the above formula (2) is the following group:

Z preferably forms, as bonded to carbon C bonding to two phenyl groups in the above formula (2), a $C_{6-12}$ bivalent alicyclic hydrocarbon group. The bivalent alicyclic hydrocarbon group may, for example, be a cycloalkylidene group such as a cyclohexylidene group, a cycloheptylidene group, a cyclododecylidene group, an admantylidene group or a cyclododecylidene group. The substituted one may be one of them substituted by a methyl group or an ethyl group. Among them, preferred is a cyclohexylidene group, a methyl-substituted cyclohexylidene group (preferably a 3,3,5-trimethyl-substituted group) or a cyclododecylidene group.

A specific preferred example of polycarbonate structural units represented by the above formula (2) is structural units derived from 2,2-bis(4-hydroxyphenyl)propane (hereinafter sometimes referred to simply as "bisphenol A") i.e. structural units derived from bisphenol A represented by the following formula (2a):

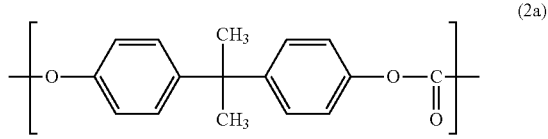

(2a)

A polycarbonate resin having structural units of the formula (2a) can be obtained by using, as a monomer, 2,2-bis (4-hydroxyphenyl)propane.

The surface layer (A) constituting the polycarbonate resin laminate of the present invention may be a composition having mixed a polycarbonate resin (a) having structural units of the above formula (1) and a polycarbonate resin (b) having structural units of the above formula (2), or a copolymer resin containing at least the respective structural units. More preferred is the mixed composition whereby the compositional ratio can easily be changed.

Each of the above mixed composition and copolymer resin may further contain structural units other than the structural units of the formulae (1) and (2).

The content of the above structural units in the polycarbonate resin can be obtained by a NMR method. Specifically, by using a nuclear magnetic resonance apparatus (a NMR apparatus), the molar compositions of the respective structural units can be obtained from the area intensity ratios of characteristic signals depending upon the hydroxy compounds used for the syntheses of the polycarbonate resins, as observed when a deutrated chloroform solution of the polycarbonate resins is subjected to $^1$H-NMR measurement. From the obtained molar compositions and the formula weights of the respective structural units, the mass ratios of the respective structural units are obtainable.

[Resin Layer (B)]

The resin layer (B) in the polycarbonate resin laminate of the present invention is preferably made of a polycarbonate resin composition which contains at least the above polycarbonate resin (b) and which comprises from 100 to 70 mass % of the polycarbonate resin (b) and from 0 to 30 mass % of the above polycarbonate resin (a). More preferably, the polycarbonate resin (b) is from 99 to 70 mass %, and the above polycarbonate resin (a) is from 1 to 30 mass %. Further preferably, the polycarbonate resin (b) is from 99 to 80 mass %, and the above polycarbonate resin (a) is from 1 to 20 mass %.

The polycarbonate resins for the resin layer (B) may not necessarily be resins having high hardness as required for the polycarbonate resins for the surface layer (A), and by using more inexpensive resins, it becomes possible to reduce the cost of the polycarbonate resin laminate.

The polycarbonate resin (a) contained in the resin layer (B) is the same as the polycarbonate resin (a) contained in the surface layer (A), i.e. it has 2,2-bis(3-methyl-4-hydroxyphenyl)propane structural units.

The polycarbonate resin (a) may have structural units other than the structural units of the above formula (1). For example, it may have structural units of the above formula (2) or structural units derived from another dihydroxy compound. The content proportion of structural units other than structural units of the formula (1) is usually at most 60 mol %, preferably at most 55 mol %, more preferably at most 50 mol %, further preferably at most 40 mol %, still further preferably at most 30 mol %, particularly preferably at most 20 mol %, especially preferably at most 10 mol %, most preferably at most 5 mol %.

The polycarbonate resin (b) contained in the resin layer (B) is the same as the polycarbonate resin (b) contained in the surface layer (A), and is a polycarbonate resin which contains at least structural units represented by the above formula (2). The description with respect to the polycarbonate resin (b) contained in the above-described surface layer (A) is applicable in the same way.

[Polycarbonate Resin Laminate]

The polycarbonate resin laminate of the present invention comprises at least the surface layer (A) and the resin layer (B), whereby it can be made to be one which has high surface hardness and high impact resistance and further is excellent also in color.

With the polycarbonate resin laminate of the present invention, the yellowness index is preferably at most 10, more preferably at most 9, further preferably at most 8, when a 7 mass % solution of the laminate dissolved in methylene chloride is measured in an optical path of 50 mm. As the yellowness index becomes large, the color tends to be deteriorated, the design nature as the laminate tends to be poor, and particularly in the case of a laminate which requires coloration, the brightness tends to be inadequate and the color tends to be dull.

It is preferred that the thickness of the surface layer (A) is thinner than the thickness of the resin layer (B), and the surface hardness (as measured in accordance with ISO 15184) measured from the surface layer (A) side is preferably at least H by pencil hardness. If the pencil hardness is less than H, the polycarbonate resin laminate tends to be susceptible to scratching, when formed into a product. The pencil hardness is in the order of 2B, B, HB, F, H, 2H, 3H and 4H from the lower rank side. The pencil hardness of the polycarbonate resin laminate is measured by the method as described later in Examples.

The polycarbonate resin (a) preferably has a higher pencil hardness as specified by ISO 15184 than the polycarbonate resin (b). The pencil hardness of the polycarbonate resin (a), as specified by ISO 15184, is preferably at least H, more preferably at least 2H. If the pencil hardness of the polycarbonate resin (a) is not at least H, it tends to be difficult to obtain a polycarbonate resin laminate having high surface hardness.

On the other hand, the pencil hardness of the polycarbonate resin (b), as specified by ISO 15184, is preferably at least 3B, particularly preferably at least 2B, within a range lower than the pencil hardness of the polycarbonate resin (a) e.g. within a range lower by at least one rank as the pencil hardness. However, if the pencil hardness of the polycarbonate resin (b) is excessively low, the surface hardness of the obtainable polycarbonate resin laminate decreases, and therefore, it is preferably at least the above hardness.

The pencil hardness of the polycarbonate resin (a) or (b), as specified by ISO 15184, is measured by the method as described later in Examples.

By making the surface layer (A) to be a layer containing the polycarbonate resin (a) as the main component, the polycarbonate resin laminate of the present invention will be one which has high surface hardness and is excellent in color and further excellent in impact resistance. Further, by laminating the resin layer (B) containing at least a polycarbonate resin (b) different from the polycarbonate resin (a), to such a surface layer (A), to form a multilayer structure and by making the surface layer (A) to be thin as compared with the resin layer (B), it will be a laminate which is free from brittleness and has a superior balance of the surface hardness, color and impact resistance.

If the polycarbonate resin laminate is too thick, for example, during the production of the laminate by coextrusion, the surface of the laminate is cooled on a cooling roll, but the interior of the laminate will be cooled later, whereby the interior is likely to undergo shrinkage to roughen the surface of the laminate. If the polycarbonate resin laminate is too thin, it is likely to be easily broken. The thickness of the polycarbonate resin laminate is preferably from 100 to 6,000 μm, more preferably from 100 to 5,000 μm, further preferably from 300 to 4,000 μm, particularly preferably from 300 to 1,500 μm.

With respect to the relation in thickness between the surface layer (A) and the resin layer (B), the thickness of the surface layer (A) is preferably thinner than the thickness of the resin layer (B). If the surface layer (A) is excessively thick and the resin layer (B) is thin, the laminate tends to be brittle and it is likely to be difficult to take a balance of the surface hardness, color and impact resistance. Inversely, if the surface layer (A) is excessively thin and the resin layer (B) is excessively thick, high surface hardness by the surface layer (A) may not be sufficiently obtainable. Thus, the thickness of the surface layer (A) is preferably from 5 to 1,000 μm, more preferably from 20 to 1,000 μm, further preferably from 20 to 200 μm. Whereas, the thickness of the resin layer (B) is preferably from 10 to 5,000 μm, more preferably from 300 to 4,000 μm, further preferably from 1,000 to 3,000 μm.

Here, the polycarbonate resin laminate of the present invention has a two-layer laminate structure of the surface layer (A) and the resin layer (B), but, as the case requires, an adhesive layer, other functional layers, etc., may be provided between the surface layer (A) and the resin layer (B). Further, also on the surface layer (A) side, an adhesive layer, other functional layers, etc. may be provided.

The viscosity average molecular weight (Mv) of each of the polycarbonate resins (a) and (b) in the surface layer (A) and the resin layer (B) constituting the polycarbonate resin laminate of the present invention, is preferably from 18,000 to 33,000. If Mv is too high, the melt viscosity of the composition comprising the polycarbonate resins (a) and (b) tends to be high, and molding of the polycarbonate resin laminate is likely to be difficult. On the other hand, if Mv is too low, molding of the polycarbonate resin laminate is likely to be difficult, and cracking is likely to occur in the polycarbonate resin laminate.

Mv of each of the polycarbonates (a) and (b) is more preferably at most 30,000, further preferably at most 28,000, and the lower limit is more preferably 20,000.

Here, Mv of the polycarbonate resin (a) or (b) means a value calculated from the Schnell viscosity formula i.e. a formula of $[\eta]=1.23\times10^{-4}Mv^{0.83}$ by obtaining the intrinsic viscosity ($[\eta]$) (unit: dl/g) at a temperature of 20° C., of its methylene chloride solution using methylene chloride as the solvent, by means of an Ubbelohde viscosity meter.

Further, the polycarbonate resin (a) or (b) may be adjusted to have the above Mv by mixing two or more types of polycarbonate resins which are different in Mv. Further, as the case requires, a polycarbonate resin having a Mv outside the above preferred range, may be mixed.

The polycarbonate resin laminate of the present invention preferably contains specific amounts of structural units derived from compounds which are formed as byproducts at the time of producing the polycarbonate resins at a high temperature by e.g. a melt polymerization reaction or at the time of preparing the polycarbonate resin laminate. Particularly when structural units derived from the following formulae (8), (9) and (10) are contained in specific amounts, it becomes possible to reduce thickness irregularity of the polycarbonate resin laminate or to suppress poor appearance due to e.g. foreign matters, and it becomes possible to obtain a polycarbonate resin laminate having excellent performance.

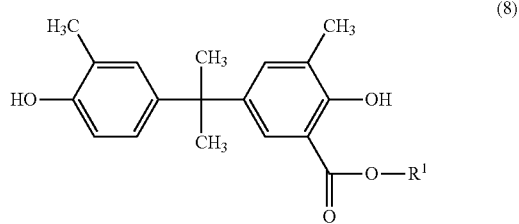

(8)

In the formula (8), $R^1$ is a hydrogen atom or a methyl group.

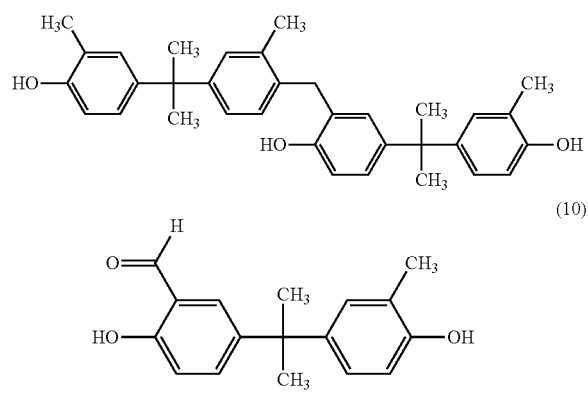

(9)

(10)

In the present invention, the contents of the respective structural units in the polycarbonate resin laminate are preferably as follows. That is, the content of structural units derived from the compound represented by the formula (8) in the polycarbonate resin laminate is preferably from 0.05 to 1,000 ppm, more preferably from 0.5 to 500 ppm, further preferably from 1.0 to 250 ppm, particularly preferably from 1.5 to 100 ppm, most preferably from 2 to 30 ppm. If the content of structural units derived from the compound represented by the formula (8) is too small, the melt viscosity change to the temperature tends to be large, and the thickness irregularity of the laminate is likely to be large. On the other hand, if it is too large, foreign matters are likely to be formed.

Further, the content of structural units derived from the compound represented by the formula (9) is preferably from 0.02 to 3,500 ppm, more preferably from 1.0 to 2,500 ppm, further preferably from 10 to 1,300 ppm, particularly preferably from 30 to 800 ppm, most preferably from 100 to 400 ppm. If the content of structural units derived from the compound represented by the formula (9) is too small, the melt viscosity change to the temperature tends to be large, and the thickness irregularity of the laminate is likely to be large. On the other hand, if it is too large, foreign matters are likely to be formed.

Further, the content of structural units derived from the compound represented by the formula (10) is preferably from 0.1 to 600 ppm, more preferably from 0.5 to 300 ppm, further preferably from 1.0 to 200 ppm, particularly preferably from 1.5 to 150 ppm, most preferably from 2.0 to 100 ppm. If the content of structural units derived from the compound represented by the formula (10) is too small, the melt viscosity change to the temperature tends to be large, and the thickness irregularity of the laminate is likely to be large. On the other hand, if it is too large, foreign matters are likely to be formed.

Further, the polycarbonate resin laminate of the present invention is one prepared by using a specific amount of the polycarbonate resin (a). Accordingly, also in the polycarbonate resin (a), structural units derived from the formulae (8), (9) and (10) are preferably contained in specific amounts. That is, in the polycarbonate resin (a), the content of structural units derived from the compound represented by the formula (8) is preferably at least 20 ppm and at most 1,000 ppm, more preferably from 30 to 800 ppm, further preferably from 40 to 600 ppm. If the content of structural units derived from the compound represented by the formula (8) is too small, the melt viscosity change to the temperature tends to be large, and the thickness irregularity of the laminate is likely to be large. On the other hand, if it is too large, foreign matters are likely to be formed.

Further, the content of structural units derived from the compound represented by the formula (9) is preferably at least 10 ppm and at most 3,500 ppm, more preferably from 30 to 3,000 ppm, further preferably from 40 to 2,000 ppm. If the content of structural units derived from the compound represented by the formula (9) is too small, the melt viscosity change to the temperature tends to be large, and the thickness irregularity of the laminate is likely to be large. On the other hand, if it is too large, foreign matters are likely to be formed.

Further, the content of structural units derived from the compound represented by the formula (10) is preferably at least 40 ppm and at most 600 ppm, more preferably from 50 to 400 ppm, further preferably from 60 to 300 ppm. If the content of structural units derived from the compound represented by the formula (10) is too small, the melt viscosity change to the temperature tends to be large, and the thickness irregularity of the laminate is likely to be large. On the other hand, if it is too large, foreign matters are likely to be formed.

The contents of structural units derived from the above formulae (8), (9) and (10) are quantified by the following method by alkali hydrolysis.

That is, a polycarbonate resin or a polycarbonate resin laminate is hydrolyzed by alkali hydrolysis, followed by quantitative analysis by liquid chromatography. Specifically, 0.5 g of a polycarbonate resin or a polycarbonate resin laminate is dissolved in 5 ml of methylene chloride. To this solution, 45 ml of methanol and 5 ml of a 25 mass % sodium hydroxide aqueous solution are added and stirred at 70° C. for 30 minutes, and the obtained solution is analyzed by liquid chromatography, whereby the amounts of compounds represented by the formulae (8), (9) and (10) are quantified and calculated.

The measurements of the amounts of the compounds represented by the formulae (8), (9) and (10) by liquid chromatography can be carried out under the following conditions.

(Analytical Conditions)

Liquid chromatography apparatus: manufactured by Shimadzu Corporation

System controller: CBM-20A
    Pump: LC-10AD
    Column oven: CTO-10ASvp
    Detector: SPD-M20A
    Analytical column: YMC-Pack ODS-AM 75 mm×φ4.6 mm
    Oven temperature: 40° C.
    Detection wavelength: 280 nm
    Eluent: solution A: 0.1% trifluoroacetic acid aqueous solution, solution B: acetonitrile
    Gradient for 25 minutes from A/B=60/40 (vol %) to A/B=95/5 (vol %)
    Flow rate: 1 mL/min
    Sample injection amount: 20 μl The compounds represented by the formulae (8), (9) and (10) are observed at the following retention times under the above liquid chromatography measurement conditions.

Compound represented by the formula (10): 13.9 minutes
    Compound represented by the formula (8): 15.9 minutes
    Compound represented by the formula (9): 21 minutes
    Identification of each compound can be carried out by sampling the portion corresponding to the peak observed at the above retention time and measuring $^1$H-NMR, $^{13}$C-NMR, mass spectrometry (MS), infrared absorption spectrum (IR spectrum), etc. of the compound in the sampled portion. Here, the content of each of the compounds represented by the formulae (8), (9) and (10) means the content of structural units derived from each compound.

[Methods for Producing Polycarbonate Resins (a) and (b)]

Now, methods for producing the polycarbonate resins (a) and (b) to be used in the present invention will be described. Hereinafter, the polycarbonate resin (a) and the polycarbonate resin (b) will sometimes generally be referred to as the polycarbonate resin.

The polycarbonate resin is obtainable by polymerization using a dihydroxy compound and a carbonyl compound. Specifically, there are an interfacial polycondensation method (hereinafter sometimes referred to also as an "interface method") wherein a dihydroxyl compound and carbonyl chloride (hereinafter sometimes referred to also as "phosgene") are reacted at an interface between an organic phase and an aqueous phase which are not optionally miscible, to prepare a polycarbonate resin, and a melt polycondensation method (hereinafter sometimes referred to also as a "melt method") wherein a dihydroxy compound and a carbonyl compound are subjected to a transesterification in a molten state e.g. in the presence of a transesterification catalyst, to prepare a polycarbonate resin.

There is no particular restriction as to the method for producing the polycarbonate resin to be used in the present invention, but it is preferred to produce the polycarbonate resin by the melt method in that no toxic phosgene is thereby used. The polycarbonate resin produced by the melt method has a merit in that the viscosity characteristic when melted, is suitable for extrusion molding. That is, in a case where extrusion molding is expected, it is preferred to use a polycarbonate resin produced by the melt method.

Now, the interface method and the melt method are, respectively, described.

<Interface Method>

In the process for producing a polycarbonate resin by the interface method, usually an alkaline aqueous solution of a dihydroxy compound is prepared, and an interfacial polycondensation reaction of the dihydroxy compound and phosgene is carried out in the presence of e.g. an amine compound as the condensation catalyst, followed by steps of neutralization, washing with water and drying, to obtain a polycarbonate resin. Specifically, the process for producing a polycarbonate resin by the interface method comprises at least a raw material preparation step of preparing raw materials such as monomer components, an oligomerization step of carrying out an oligomerization reaction, a polycondensation step of carrying out a polycondensation reaction using the oligomer, a washing step of washing the reaction solution after the polycondensation reaction by alkaline washing, acid washing and water washing, a polycarbonate resin-isolating step of concentrating the washed solution and isolating the polycarbonate resin after granulation, and a drying step of drying the isolated polycarbonate resin particles. Now, the respective steps will be described.

(Raw Material Preparation Step)

In the raw material preparation step, in a raw material tank, a raw material such as an alkaline aqueous solution of a dihydroxy compound is prepared which contains a dihydroxy compound, an aqueous solution of an alkali metal compound such as sodium hydroxide/an aqueous solution of an alkaline earth metal compound such as magnesium hydroxide, demineralized water and further, as the case requires, a reducing agent such as hydrosulfite.

(Dihydroxy Compound)

As the dihydroxy compound which is a raw material for the polycarbonate resin, one or more of the above-mentioned dihydroxy compounds may be mentioned.

(Alkali Metal Compound and/or Alkaline Earth Metal Compound)

As the alkali metal compound and/or the alkaline earth metal compound, a hydroxide is usually preferred. For example, one or more of sodium hydroxide, lithium hydroxide, potassium hydroxide, magnesium hydroxide and calcium hydroxide may be mentioned. Among them, sodium hydroxide is particularly preferred. The ratio of the alkali metal compound and/or the alkaline earth metal compound to the dihydroxy compound is usually from 1.0 to 1.5 (equivalent ratio), preferably from 1.02 to 1.04 (equivalent ratio). If the ratio of the alkali metal compound and/or the alkaline earth metal compound is excessively large or excessively small, such is influential to the terminal groups of the carbonate oligomer obtainable in the after-described oligomerization step, and as a result, the polycondensation reaction tends to be irregular. Here, in the present invention, alkaline earth metals are Group 2 elements in the Periodic Table.

(Oligomerization Step)

In the oligomerization step, firstly in a prescribed reactor, using the alkaline aqueous solution of a dihydroxy compound prepared in the raw material preparation step and phosgene, a phosgenation reaction of the dihydroxy compound is carried out in the presence of an organic solvent such as methylene chloride.

Then, to the mixed solution in which the phosgenation reaction of the dihydroxy compound was carried out, a condensation catalyst such as triethylamine and a chain stopper such as p-t-butylphenol are added, and an oligomerization reaction of the dihydroxy compound is carried out.

Then, after a further oligomerization reaction is allowed to proceed, the oligomerization reaction liquid of the dihydroxy compound is introduced into a prescribed static separation tank, an organic phase containing the carbonate oligomer and an aqueous phase are separated, and the separated organic phase is supplied to a polycondensation step.

Here, the retention time in the oligomerization step after the alkaline aqueous solution of the dihydroxy compound is supplied to the reactor in which the phosgenation reaction of the dihydroxy compound is carried out until the oligomerization reaction liquid enters the static separation tank, is usually at most 120 minutes, preferably from 30 to 60 minutes.

(Phosgene)

Phosgene to be used in the oligomerization step is usually used in the form of liquid or gas. The preferred amount of use of phosgene in the oligomerization step is properly selected depending upon the reaction conditions, particularly the reaction temperature and the concentration of the dihydroxy compound in the aqueous phase and is not particularly limited. Usually, the amount of phosgene is from 1 to 2 mol, preferably from 1.05 to 1.5 mol, per 1 mol of the dihydroxy compound. If the amount of use of phosgene is excessively large, unreacted phosgene tends to increase, and the units may remarkably be deteriorated. Further, if the amount of use of phosgene is excessively small, the chloroformate group amount tends to be insufficient, and no appropriate molecular weight growth tends to be conducted.

(Organic Solvent)

In the oligomerization step, usually an organic solvent is used. The organic solvent may be any optional inert organic solvent in which phosgene and reaction products such as the carbonate oligomer and the polycarbonate resin are dissolved at the reaction temperature under the reaction pressure in the oligomerization step, and which is not miscible with water (or which does not form a solution with water).

Such an inert organic solvent may, for example, be a chlorinated aliphatic hydrocarbon such as dichloromethane, chloroform, carbon tetrachloride, dichloroethane, trichloroethane, tetrachloroethane, dichloropropane or 1,2-dichloroethylene; an aromatic hydrocarbon such as benzene, toluene or xylene, a chlorinated aromatic hydrocarbon such as chlorobenzene, o-dichlorobenzene or chlorotoluene; or a substituted aromatic hydrocarbon such as nitrobenzene or acetophenone.

Among them, a chlorinated hydrocarbon such dichloromethane or chlorobenzene is suitably used.

Such an inert organic solvent may be used alone or as a mixture with another solvent.

(Condensation Catalyst)

The oligomerization reaction may be carried out in the presence of a condensation catalyst. The timing of addition of the condensation catalyst is preferably after phosgene is consumed. The condensation catalyst may optionally be selected among many condensation catalysts which are used for a two-phase interfacial condensation method. For example, one or more of trialkylamine, N-ethylpyrrolidone, N-ethylpiperidine, N-ethylmorpholine, N-isopropylpiperidine and N-isopropylmorpholine may be mentioned. Among them, triethylamine or N-ethylpiperidine is preferred.

(Chain Stopper)

In the oligomerization step, usually a monophenol is used as the chain stopper. The monophenol may, for example, be one or more of phenol; an alkylphenol (the number of carbon atoms in the alkyl group is from 1 to 20) such as p-t-butylphenol or p-cresol; and a halogenated phenol such as p-chlorophenol or 2,4,6-tribromophenol. The amount of use of the monophenol is properly selected depending upon the molecular weight of the obtainable carbonate oligomer, and is usually from 0.5 to 10 mol %, preferably from 6 to 8 mol %, based on the dihydroxy compound.

In the interface method, the molecular weight of the polycarbonate resin is determined by the amount of addition of the chain stopper such as the monophenol. Accordingly, the timing of addition of the chain stopper is preferably between immediately after completion of consumption of the carbonate-forming compound and before the molecular weight growth starts, with a view to controlling the molecular weight of the polycarbonate resin.

If the monophenol is added when the carbonate-forming compound coexists, a condensate of the monophenol (a diphenyl carbonate) forms in a large amount, and a polycarbonate resin having a desired molecular weight tends to be hardly obtainable. If the timing of addition of the monophenol is too late, there may be such drawbacks that the molecular weight control tends to be difficult, the obtainable resin may have a specific shoulder on the low molecular side in the molecular weight distribution, and sagging may occur at the time of molding.

(Branching Agent)

In the oligomerization step, an optional branching agent may be used. Such a branching agent may, for example, be one or more of 2,4-bis(4-hydroxyphenylisopropyl)phenol, 2,6-bis(2-hydroxy-5-methylbenzyl)-4-methylphenol, 2-(4-hydroxyphenyl)-2-(2,4-dihydroxyphenyl)propane and 1,4-bis(4,4'-dihydroxytriphenylmethyl)benzene. Further, 2,4-dihydroxybenzoic acid, trimesic acid, cyanuric chloride or the like may also be used. Among them, a branching agent having at least three phenolic hydroxy groups is suitable.

The amount of use of the branching agent is properly selected depending upon the degree of branching of the obtainable carbonate oligomer, and is usually preferably from 0.05 to 2 mol %, more preferably from 0.1 to 1 mol %, based on the dihydroxy compound.

In the oligomerization step, in a case where the two-phase interfacial condensation method is employed, it is preferred that prior to the contact of the alkali metal compound aqueous solution and/or the alkaline earth metal compound aqueous solution of the dihydroxy compound with phosgene, the organic phase containing the dihydroxy compound and the aqueous phase containing the alkali metal compound and/or the alkaline earth metal compound are brought into contact with an organic phase not optionally miscible with water, to form an emulsion.

As a means of forming such an emulsion, it is preferred to use, for example, a mixing machine such as a stirring machine having a predetermined stirring blade, a dynamic mixer such as a homogenizer, a homomixer, a colloid mill, a flow jet mixer or an ultrasonic emulsifier, or a static mixer. The emulsion usually has a droplet size of from 0.01 to 10 μm, and has emulsion stability.

The emulsified state of the emulsion is usually represented by the Weber number or P/q (driver power per unit volume). The Weber number is preferably at least 10,000, more preferably at least 20,000, most preferably at least 35,000. Further, as the upper limit, at a level of at most 1,000,000 is enough. Further, P/q is preferably at least 200 kg·m/L, more preferably at least 500 kg·m/L, most preferably at least 1,000 kg·m/L.

Contact of the emulsion with phosgene (CDC) is preferably carried out under mixing conditions weaker than the above-described emulsifying conditions, with a view to suppressing dissolution of CDC in the organic phase. The Weber number is less than 10,000, preferably less than 5,000, more preferably less than 2,000. Further, P/q is less than 200 kg·m/L, preferably less than 100 kg·m/L, more preferably less than 50 kg·m/L. Contact with phosgene can be achieved by introducing CDC into a tubular type reactor or a vessel-type reactor.

The reaction temperature in the oligomerization step is usually at most 80° C., preferably at most 60° C., further preferably within a range of from 10 to 50° C. The reaction time is properly selected depending upon the reaction temperature, and is usually from 0.5 minute to 10 hours, preferably from 1 minute to 2 hours. If the reaction temperature is excessively high, the side reaction cannot be controlled, and the phosgene units tend to be deteriorated. If the reaction temperature is excessively low, although such is preferred with a view to controlling the reaction, the refrigeration load tends to increase, thus leading to the cost increases.

The carbonate oligomer concentration in the organic phase may be in such a range that the obtainable carbonate oligomer is soluble, and specifically, it is preferably at a level of from 10 to 40 mass %, more preferably from 12 to 25 mass %. The proportion of the organic phase is preferably from 0.2 to 1.0 by volume ratio based on the aqueous phase containing an alkali metal salt aqueous solution or an alkaline earth metal salt aqueous solution of the of the dihydroxy compound.

(Polycondensation Step)

In the polycondensation step, the organic phase containing the carbonate oligomer separated from the aqueous phase in the static separation tank is transferred to an oligomer tank having a stirring machine. In the oligomer tank, a condensation catalyst such as triethylamine is further added.

Then, the organic phase stirred in the oligomer tank is introduced into a prescribed polycondensation reactor. Then, to the polycondensation reactor, demineralized water, an organic solvent such as methylene chloride, a sodium hydroxide aqueous solution, etc. are supplied, stirred and mixed to carry out a polycondensation reaction of the carbonate oligomer.

The polycondensation reaction liquid in the polycondensation reactor is then continuously introduced successively to a plurality of polycondensation reactors, whereby the polycondensation reaction of the carbonate oligomer is completed.

In the polycondensation step, the retention time in the polycondensation reactors in which the polycondensation reaction of the carbonate oligomer is continuously carried out is usually at most 12 hours, preferably from 0.5 to 5 hours.

In the polycondensation step, firstly, the organic phase containing the carbonate oligomer and the aqueous phase are separated, and as the case requires, an inert organic solvent is added to the separated organic phase to adjust the concentration of the carbonate oligomer. In such a case, the amount of the inert organic solvent is adjusted so that the concentration of the polycarbonate resin in the organic phase obtainable by the polycondensation reaction is from 5 to 30 mass %, preferably from 8 to 14 mass %. Then, water and an aqueous solution containing an alkali metal compound and/or an alkaline earth metal compound, are newly added, and further, to adjust the polycondensation conditions, preferably a condensation catalyst is added, and the polycondensation reaction is carried out in accordance with the interfacial polycondensation method. The ratio of the organic phase to the aqueous phase in the polycondensation reaction is such that the organic phase:the aqueous phase is preferably from 1:0.2 to 1:1, more preferably from 1:0.4 to 1:0.8 by volume ratio.

As the alkali metal compound and/or the alkaline earth metal compound, the same compound as one used in the above-described oligomerization step may be mentioned. Particularly, sodium hydroxide is industrially preferred. The amount of use of the alkali metal compound and/or the alkaline earth metal compound may be at least an amount with which the reaction system is always alkaline during the polycondensation reaction. In the addition of these compounds, the entire amount may be added all at once at the start of the polycondensation reaction, or they may be added as properly divided during the polycondensation reaction.

If the amount of use of the alkali metal compound and/or the alkaline earth metal compound is excessively large, a hydrolysis reaction as a side reaction tends to proceed. Accordingly, the concentration of the alkali metal compound and/or the alkaline earth metal compound contained in the aqueous phase after completion of the polycondensation reaction is adjusted to be preferably at least 0.05 N (normality), more preferably at a level of from 0.05 to 0.3 N.

The temperature for the polycondensation reaction in the polycondensation step is usually in the vicinity of room temperature. The reaction time is from 0.5 to 5 hours, preferably at a level of from 1 to 3 hours.

(Washing Step)

After completion of the polycondensation reaction in the polycondensation reactors, the polycondensation reaction liquid is subjected to alkali washing with an alkaline washing liquid, acid washing with an acid washing liquid and water washing with washing water by a known method. The entire retention time in the washing step is usually at most 12 hours, preferably from 0.5 to 6 hours.

(Polycarbonate Resin Isolation Step)

In the polycarbonate resin isolation step, firstly, the polycondensation reaction liquid containing the polycarbonate resin washed in the washing step is concentrated to a predetermined solid content concentration to prepare a concentrated liquid. The solid content concentration of the polycarbonate resin in the concentrated liquid is usually from 5 to 35 mass %, preferably from 10 to 30 mass %.

Then, the concentrated liquid is continuously supplied to a prescribed granulation tank, and stirred and mixed with demineralized water of a predetermined temperature. In the granulation tank, a granulation treatment of evaporating the organic solvent while maintaining the suspended state in water is carried out to form a water slurry containing polycarbonate resin granules.

Here, the temperature of demineralized water is usually from 37 to 67° C., preferably from 40 to 50° C. Further, the solidification temperature of the polycarbonate resin by the granulation treatment carried out in the granulation tank is usually from 37 to 67° C., preferably from 40 to 50° C.

The water slurry containing a polycarbonate resin powder continuously discharged from the granulation tank is then continuously introduced into a prescribed separator, and water is separated from the water slurry.

(Drying Step)

In the drying step, the polycarbonate resin powder after water is separated from the water slurry in the separator, is continuously supplied to a prescribed dryer, made to stay for a predetermined retention time and then continuously withdrawn. The dryer may, for example, be a fluidized bed dryer. Further, a plurality of fluidized bed dryer may be connected in series to carry out the drying treatment continuously.

Here, the dryer usually has a heating means such as a heat medium jacket, and is maintained usually at from 0.1 to 1.0 MPa-G, preferably from 0.2 to 0.6 MPa-G, for example, by water vapor, whereby the temperature of nitrogen ($N_2$) which flows in the dryer is maintained usually at from 100 to 200° C., preferably from 120 to 180° C.

<Melt Method>

In the process for producing a polycarbonate resin by a melt method, the dihydroxy compound and the carbonyl compound are subjected to a transesterification in a molten state in the presence of a transesterification catalyst to produce a polycarbonate resin.

(Dihydroxy Compound)

The dihydroxy compound as a raw material for the polycarbonate resin may specifically be one or more of the dihydroxy compounds as described above.

(Carbonic Diester)

The carbonic diester as the material for the polycarbonate resin of the present invention may be a compound represented by the following formula (3).

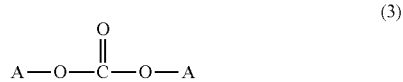

(3)

In the formula (3), A is a $C_{1-10}$ linear, branched or cyclic monovalent hydrocarbon group which may be substituted. Two A's may be the same or different.

Here, examples of a substituent in the A include a halogen atom, a $C_{1-10}$ alkyl group, a $C_{1-10}$ alkoxy group, a phenyl group, a phenoxy group, a vinyl group, a cyano group, an ester group, an amide group and a nitro group.

Specific examples of the carbonic diester include diphenyl carbonate, a substituted diphenyl carbonate such as ditolyl carbonate, and a dialkyl carbonate such as dimethyl carbonate, diethyl carbonate or di-t-butyl carbonate.

Among them, diphenyl carbonate (hereinafter sometimes referred to as "DPC") and a substituted diphenyl carbonate are preferred. These carbonic diesters may be used alone or as a mixture of two or more of them.

Furthermore, the carbonic diester compound may be replaced by a dicarboxylic acid or a dicarboxylic ester in an amount of preferably at most 50 mol %, more preferably at most 30 mol %. Representative examples of the dicarboxylic acid or the dicarboxylic ester include terephthalic acid, isophthalic acid, diphenyl terephthalate and diphenyl isophthalate. When the carbonic diester is replaced by such a dicarboxylic acid or a dicarboxylic ester, a polyester carbonate is obtainable.

In the process for producing the polycarbonate resin of the present invention by the melt method, as the amount of use of such a carbonic diester (including the above substitutional dicarboxylic acid or dicarboxylic ester; the same applies hereinafter), the carbonic diester is usually from 1.01 to 1.30 mol, preferably from 1.02 to 1.20 mol per 1 mol of the dihydroxy compound. If the amount of the carbonic diester is excessively low, the transesterification rate tends to be lowered, whereby the production of a polycarbonate resin having a desired molecular weight is difficult, or the terminal hydroxy group concentration of the obtainable polycarbonate resin tends to be high, thus deteriorating the thermal stability. Further, if the amount of the carbonic diester is excessively high, the transesterification rate tends to be decreased, and the production of a polycarbonate resin having a desired molecular weight tends to be difficult, and in addition, an amount of the carbonic diester compound remaining in the resin becomes so large as to produce an unpleasant odor during the molding process or when formed into a laminate.

(Transesterification Catalyst)

The transesterification catalyst to be used in the process for producing the polycarbonate resin of the present invention by the melt method, may be one of catalysts commonly used in producing a polycarbonate resin by a transesterification method, and is not particularly limited.

For example, basic compounds may be mentioned such as an alkali metal compound, an alkaline earth metal compound, a basic boron compound, a basic phosphorus compound, a basic ammonium compound, and an amine compound. Among them, an alkali metal compound or an alkaline earth metal compound is practically preferred. These transesterification catalysts may be used alone or as a mixture of two or more of them.

The amount of use of the transesterification catalyst is usually within a range of from $1\times10^{-9}$ to $1\times10^{-3}$ mol per 1 mol of the entire dihydroxy compound. In order to obtain a polycarbonate resin excellent in the moldability and the hue, the amount of the transesterification catalyst is, when an alkali metal compound and/or an alkaline earth metal compound is used, preferably from $1.0\times10^{-8}$ to $1\times10^{-4}$ mol, more preferably from $1.0\times10^{-8}$ to $1\times10^{-5}$ mol, particularly preferably from $1.0\times10^{-7}$ to $5.0\times10^{-6}$ mol, per 1 mol of the entire dihydroxy compound. If the amount is smaller than the above lower limit, no adequate polymerization activity necessary to produce a polycarbonate resin having a desired molecular weight will be obtained, and if it is larger than the above upper limit, the polymer hue may be deteriorated, or the amount of branching tends to be too large, thus leading to a decrease in the fluidity, whereby no desired polycarbonate resin having excellent melt properties will be obtained.

Examples of the alkali metal compound include inorganic alkali metal compounds such as hydroxides, carbonates and hydrogen carbonate compounds of alkali metals; and organic alkali metal compounds such as salts of alkali metals with alcohols, phenols or organic carboxylic acids. Here, the alkali metals include, for example, lithium, sodium, potassium, rubidium and cesium.

Among such alkali metal compounds, a cesium compound is preferred, and cesium carbonate, cesium hydrogen carbonate and cesium hydroxide are particularly preferred.

Examples of the alkaline earth metal compound include inorganic alkaline earth metal compounds such as hydroxides or carbonates of alkaline earth metals; and salts of alkaline earth metals with alcohols, phenols or organic carboxylic acids. Here, the alkaline earth metals include, for example, beryllium, magnesium, calcium, strontium and barium.

Examples of the basic boron compound include a sodium salt, a potassium salt, a lithium salt, a calcium salt, a magnesium salt, a barium salt and a strontium salt of a boron compound. Examples of the boron compound include tetramethyl boron, tetraethyl boron, tetrapropyl boron, tetrabutyl boron, trimethylethyl boron, trimethylbenzyl boron, trimethylphenyl boron, triethylmethyl boron, triethylbenzyl boron, triethylphenyl boron, tributylbenzyl boron, tributyl-phenyl boron, tetraphenyl boron, benzyltriphenyl boron, methyltriphenyl boron and butyltriphenyl boron.

Examples of the basic phosphorus compound include trivalent phosphorus compounds such as triethylphosphine, tri-n-propylphosphine, triisopropylphosphine, tri-n-butylphosphine, triphenylphosphine and tributylphosphine; and quaternary phosphonium salts derived from these compounds.

Examples of the basic ammonium compound include tetramethylammonium hydroxide, tetraethylammonium hydroxide, tetrapropylammonium hydroxide, tetrabutylammonium hydroxide, trimethylethylammonium hydroxide, trimethylbenzylammonium hydroxide, trimethylphenylammonium hydroxide, triethylmethylammonium hydroxide, triethylbenzylammonium hydroxide, triethylphenylammonium hydroxide, tributylbenzylammonium hydroxide, tributylphenylammonium hydroxide, tetraphenylammonium hydroxide, benzyltriphenylammonium hydroxide, methyltriphenylammonium hydroxide and butyltriphenylammonium hydroxide.

Examples of the amine compound include 4-aminopyridine, 2-aminopyridine, N,N-dimethyl-4-aminopyridine, 4-diethylaminopyridine, 2-hydroxypyridine, 2-methoxypyridine, 4-methoxypyridine, 2-dimethylaminoimidazole, 2-methoxyimidazole, imidazole, 2-mercaptoimidazole, 2-methylimidazole and aminoquinoline.

(Catalyst Deactivating Agent)

In the melt method, after completion of the transesterification, a catalyst deactivating agent to neutralize and deactivate the transesterification catalyst may be added. By the addition of such a deactivating agent, the heat resistance and the hydrolysis resistance of a polycarbonate resin obtained will be improved.

Such a catalyst deactivating agent is preferably an acidic compound having pKa of at most 3, such as sulfonic acid or a sulfonate, and specifically, it may, for example, be benzenesulfonic acid, p-toluenesulfonic acid, methyl benzenesulfonate, ethyl benzenesulfonate, propyl benzenesulfonate, butyl benzenesulfonate, methyl p-toluenesulfonate, ethyl p-toluenesulfonate, propyl p-toluenesulfonate or butyl p-toluenesulfonate. They may be used alone, or two or more of them may be used in combination.

Among them, p-toluenesulfonic acid or butyl p-toluenesulfonate is suitably used.

The process for producing the polycarbonate resin by the melt method is a process of preparing a material mixture melt containing the dihydroxy compound and the carbonic diester as materials (raw material preparation step) and subjecting the material mixture melt to a multi-stage polycondensation reaction in a molten state in the presence of a transesterification catalyst using a plurality of reactors (polycondensation step). The reaction method may be any of a batchwise method, a continuous method and a combination of a batchwise method and a continuous method. As the reactors, a plurality of vertical reactors and as the case requires, at least one horizontal stirring reactor successive thereto are used. Usually, these reaction vessels are connected in series to carry out the treatment continuously.

After the polycondensation step, a step of terminating the reaction and evaporating and removing unreacted materials and reaction by-products in the polycondensation reaction liquid, a step of adding a thermal stabilizer, a mold release agent, a colorant or the like, a step of forming the polycarbonate resin into a predetermined particle size, or the like may properly be added.

Now, the respective steps will be described below.

(Raw Material Preparation Step)

The dihydroxy compound and the carbonic diester to be used as raw materials of the polycarbonate resin are usually prepared as a material mixture melt using a batchwise, semibatchwise or continuous stirring vessel type apparatus in an atmosphere of an inert gas such as nitrogen or argon. For example, in the case of using bisphenol A as the dihydroxy compound and diphenyl carbonate as the carbonic diester, the temperature for melt mixing is usually from 120 to 180° C., preferably from 125 to 160° C.

Now, a case of using, as materials, bisphenol A as the dihydroxy compound and diphenyl carbonate as the carbonic diester will be described as an example.

In this case, the ratio of the dihydroxy compound to the carbonic diester is adjusted so that the carbonic diester is in excess, and as mentioned above, the carbonic diester is adjusted to be in a proportion of usually from 1.01 to 1.30 mol, preferably from 1.02 to 1.20 mol, per 1 mol of the dihydroxy compound.

(Polycondensation Step)

The polycondensation reaction by a transesterification between the dihydroxy compound and the carbonic diester is continuously conducted by a multiple-stage method of usually at least two stages, preferably from 3 to 7 stages. Specific reaction conditions in each stage are within the following ranges: the temperature is from 150 to 320° C., the pressure is from ordinary pressure to 0.01 Torr (1.3 Pa), and the average residence time is from 5 to 150 minutes.

The temperature and vacuum are generally set to become higher stepwise within the above reaction conditions in each of the reactors of the multi-stage method, in order to effectively discharge the monohydroxy compound such as phenol produced as a by-product with the progress of the transesterification.

When the polycondensation step is conducted by the multi-stage method, it is usual to provide a plurality of reactors including vertical stirring reactors to increase the average molecular weight of the polycarbonate resin. The number of reactors is usually from 2 to 6, preferably from 4 to 5.

Here, the reactors may, for example, be stirring vessel type reactors, thin-film reactors, centrifugal thin-film evaporation reactors, surface renewal type twin screw kneading reactors, twin screw horizontal stirring reactors, wet wall type reactors, porous plate type reactors in which polycondensation proceeds during a free fall, and porous plate type reactors provided with a wire, in which polycondensation proceeds during a fall along the wire.

Examples of the type of the stirring blade in the vertical stirring reactors include a turbine blade, a paddle blade, a Pfaudler blade, an anchor blade, a FULLZONE blade (manufactured by Kobelco Eco-Solutions Co., Ltd.), a SANMELLER blade (manufactured by MITSUBISHI HEAVY INDUSTRIES, LTD.), a MAXBLEND blade (manufactured by SHI Mechanical & Equipment Inc.), a helical ribbon blade, and a lattice type twisting blade (manufactured by Hitachi Plant Technologies, Ltd.).

Further, the horizontal stirring reactor refers to a reactor provided with a stirring blade a revolution axis of which is horizontal (horizontal direction). Examples of the stirring blade in the horizontal reactor include single shaft stirring blades such as a disk type and a paddle type, and two shaft stirring blades such as HVR, SCR and N-SCR (manufactured by MITSUBISHI HEAVY INDUSTRIES, LTD.), Bivolak (manufactured by SHI Mechanical & Equipment Inc.), and a spectacle-shaped blade and a lattice type blade (manufactured by Hitachi Plant Technologies, Ltd.).

Further, the transesterification catalyst used for the polycondensation of the dihydroxy compound and the carbonic diester compound may be usually previously prepared as a solution. The concentration of the catalyst solution is not particularly limited, and it is adjusted to an optional concentration according to the solubility of the catalyst in the solvent. As the solvent, acetone, an alcohol, toluene, phenol, water or the like may properly be selected.

In a case where water is selected as the solvent, the properties of the water are not particularly limited so long as types and concentrations of impurities contained therein are constant. Usually, distilled water, deionized water or the like is preferably used.

<Composition of Polycarbonate Resins (a) and (b)>

Preparation of the composition of the polycarbonate resins (a) and (b) is preferably carried out by a method of the following (1) to (4).

(1) a method of melt-kneading the polycarbonate resin (a) and the polycarbonate resin (b);

(2) a method of melt-kneading the polycarbonate resin (a) in a molten state and the polycarbonate resin (b) in a molten state;

(3) a method of mixing the polycarbonate resin (a) and the polycarbonate resin (b) in a solution state, or (4) a method of dry-blending the polycarbonate resin (a) and the polycarbonate resin (b).

Now, the respective methods will be described.

(1) Method of Melt-Kneading Polycarbonate Resin (a) and Polycarbonate Resin (b)

Pellets or granules of the polycarbonate resin (a) and pellets or granules of the polycarbonate resin (b) are melt-kneaded by using a mixing apparatus such as a kneader, a twin screw extruder or a single screw extruder. The pellets or granules of the polycarbonate resin (a) and the pellets or granules of the polycarbonate resin (b) may preliminarily be mixed in a solid state and then kneaded, or either one of them is preliminarily melted in the above mixing apparatus, and the other polycarbonate resin is added and kneaded. The temperature at which they are kneaded is not particularly limited, but is preferably at least 200° C., more preferably at least 230° C., further preferably at least 260° C. Further, it is preferably at most 350° C., particularly preferably at most 320° C. If the kneading temperature is too low, mixing of the polycarbonate resin (a) and the polycarbonate resin (b) will not be complete, and when a polycarbonate resin laminate is produced, there may be variation in the pencil hardness, etc. Further, if the kneading temperature is too high, the content of structural units derived from the above-mentioned formulae (8), (9) and (10) tends to increase, whereby foreign matters are likely to be formed in the polycarbonate resin laminate, or the color is likely to be deteriorated.

(2) Method of Melt-Kneading Polycarbonate Resin (a) in Molten State and Polycarbonate Resin (b) in Molten State The polycarbonate resin (a) in a molten state and the polycarbonate resin (b) in a molten state are mixed by means of a mixing apparatus such as a stirring vessel, a static mixer, a kneader, a twin screw extruder or a single screw extruder. In such a case, for example, a polycarbonate resin obtained by the melt polymerization method may be introduced into the above mixing apparatus in a molten state without cooling and solidification. The mixing temperature is not particularly limited, but is preferably at least 200° C., more preferably at least 230° C., further preferably at least 260° C. Further, it is preferably at most 350° C., particularly preferably at most 320° C. If the mixing temperature is low, mixing of the polycarbonate resin (a) and the polycarbonate resin (b) will not be complete, and when a polycarbonate resin laminate is produced, there may be variation in the pencil hardness, etc. Further, if the mixing temperature is too high, the content of structural units derived from the above-mentioned formulae (8), (9) and (10) tends to increase, whereby foreign matters are likely to be formed in the polycarbonate resin laminate, or the color is likely to be deteriorated.

(3) Method of Mixing Polycarbonate Resin (a) and Polycarbonate Resin (b) in Solution State The polycarbonate resin (a) and the polycarbonate resin (b) are dissolved in a solvent to form solutions, and they are mixed in a solution state and then isolated as a polycarbonate resin composition. Such a solvent may, for example, be a chlorinated aliphatic hydrocarbon such as dichloromethane, chloroform, carbon tetrachloride, dichloroethane, trichloroethane, tetrachloroethane, dichloropropane or 1,2-dichloroethylene; an aromatic hydrocarbon such as benzene, toluene or xylene; or a substituted aromatic hydrocarbon such as nitrobenzene or acetophenone. Among them, a chlorinated hydrocarbon such as dichloromethane or chlorobenzene is suitably used. Such a solvent may be used alone or as a mixture with another solvent.

The mixing apparatus may, for example, be a stirring vessel or a static mixer. Further, the mixing temperature is not particularly limited so long as the polycarbonate resin (a) and the polycarbonate resin (b) are soluble, and is usually at most the boiling point of the solvent used.

(4) Method of Dry-Blending Polycarbonate Resin (a) and Polycarbonate Resin (b)

Pellets or granules of the polycarbonate resin (a) and pellets or granules of the polycarbonate resin (b) are dry-blended by using a tumbler, a super mixer, a Henschel mixer, a Nauta mixer or the like.

Among the above methods (1) to (4), preferred are the methods (1) and (2) of melt-kneading the polycarbonate resin (a) and the polycarbonate resin (b) and the method (4) of dry-blending the polycarbonate resin (a) and the polycarbonate resin (b). The method (1) of melt-kneading the polycarbonate resin (a) and the polycarbonate resin (b) is more preferred.

At the time of production of the composition of the polycarbonate resins (a) and (b), in any of the above methods, various additives may suitably be added to the polycarbonate resins (a) and (b) within a range not to impair the objects of the present invention. Such additives may, for example, be a polymer modifier, a thermal stabilizer, an antioxidant, an ultraviolet absorber, a fluorescent whitener, a photo-stabilizer, a colorant such as a pigment or dye, a flame retardant, an antistatic agent, a lubricant, a plasticizer, a mold release agent, an inorganic filler, a light diffusing agent, an anti-fogging agent, a flowability-improving agent, a dispersant, an anti-fungal agent, etc.

Further, within a range not to impair the effects of the present invention, one or more of resin components other than the polycarbonate resins, such as polyamide, polyethylene, polypropylene, polyester, polyphenylene ether, polystyrene, polyphenylene sulfide, polysulfone, polyether sulfone, an ABS resin, a SAN resin, a liquid crystal polymer, etc., may be added and mixed. However, in order to effectively obtain the effects of the present invention by using the polycarbonate resin (a) and the polycarbonate resin (b) in the predetermined proportions, when such other resin components are to be employed, they should be preferably at most 30 mass %, more preferably at most 10 mass %, particularly preferably at most 5 mass %, to the total of the polycarbonate resin (a) and the polycarbonate resin (b).

Further, in the polycarbonate resin composition, as the polycarbonate resin (b), one type may be used alone, or two or more types different in the raw material dihydroxy compounds, the process for their production, the viscosity average molecular weights, or the like, may be used as mixed. Likewise, as the polycarbonate resin (a), one type may be used alone, or two or more types different in the raw material dihydroxy compounds, the process for their production, the viscosity average molecular weights, or the like, may be used as mixed.

[Methods for Preparing Polycarbonate Resin Laminate]

The method for preparing the polycarbonate resin laminate of the present invention is not particularly limited. For example, the following three methods may be mentioned. Among them, a coextrusion molding method and a thermocompression molding method are preferred, whereby the surface hardness, etc. tend to be uniform over the entire surface of the sheet.

(1) Coextrusion molding method: Resin compositions for the surface layer (A) and the resin layer (B) are subjected to melt coextrusion, respectively, at temperatures higher by preferably from 100 to 200° C., more preferably from 120 to 180° C., than the glass transition temperatures (hereinafter Tg) of the resin compositions, etc.

The barrel temperature of the extruder in the case of producing the polycarbonate resin laminate, is not particularly limited, but it is preferably at most 360° C., more preferably at most 340° C., most preferably at most 320° C. Further, it is preferably at least 220° C., more preferably at least 240° C., most preferably at least 260° C. If the barrel temperature is too high, the melt viscosity tends to be low, and molding of the laminate may sometimes be difficult. Further, the content of structural units derived from the above-mentioned formulae (8), (9) and (10) is likely to be increased excessively, whereby foreign matters are likely to be formed in the polycarbonate resin laminate, or the color is likely to be deteriorated. If the barrel temperature is too low, the melt viscosity tends to be high, and the resin pressure tends to be high, whereby a T-die may sometimes be clogged. Here, an extruder is usually provided with a die so-called T-die having a certain specific thickness, and from such a T-die, a polycarbonate resin laminate is extruded in a molten state.

Then, the extruded molten state polycarbonate resin laminate is cooled by a roll and becomes to be a polycarbonate resin laminate having a uniform thickness. The cooling temperature by the roll is from 80 to 160° C., preferably from 90 to 140° C. If the roll temperature is too high, the molten state polycarbonate resin laminate extruded from the T-die tends to stay as attached to the cooling roll, and the laminate may not be molded. If the roll temperature is too low, the molten state polycarbonate resin laminate extruded from the T-die is rapidly cooled on the cooling roll to form gear marks, whereby the surface smoothness of the laminate will be deteriorated.

(2) Injection molding method: Double molding is carried out at temperatures higher by preferably from 100 to 200° C., more preferably from 120 to 180° C., than Tg of the resin compositions for the surface layer (A) and the resin layer (B), etc. Or, a molded sheet of one of the resin compositions for the surface layer (A) and the resin layer (B) preliminarily molded by extrusion molding or injection molding, is disposed in a mold and then, the other is injection-molded for integration.

(3) Thermocompression method: Molded sheets of the resin compositions for the surface layer (A) and the resin layer (B) preliminarily molded by extrusion molding or injection molding, are subjected to thermal compression bonding by a laminating machine or a pressing machine. Or, on a molded sheet of one of the resin compositions for the surface layer (A) and the resin layer (B) immediately after extrusion, the other sheet preliminarily molded, is bonded by thermocompression bonding. In such a case, the temperature for thermocompression bonding is set to be a temperature higher by from 100 to 200° C., preferably from 90 to 140° C., than Tg of whichever higher between the resin compositions for the surface layer (A) and the resin layer (B).

Otherwise, preliminarily molded sheets of the resin compositions for the surface layer (A) and the resin layer (B) may be bonded by means of an adhesive to obtain a polycarbonate resin laminate of the present invention.

In the process for preparing the polycarbonate resin laminate of the present invention, waste materials such as cut pieces or burrs are discharged, for example, at the time of trimming end surfaces of sheets or laminates obtained by extrusion molding or coextrusion molding.

In the present invention, such waste materials may be used for the next molding by suitably mixing them to the resin compositions for the surface layer (A) and the resin layer (B). However, when such waste materials are to be recycled for use, if their amount is excessively large, and the proportion of a virgin resin is small, the mechanical properties such as surface hardness, color, impact resistance, etc. of the obtainable polycarbonate resin laminate may sometimes be impaired. Therefore, the amount of such waste materials to be used, is preferably at most 30 mass %, particularly at most 20 mass %, e.g. at a level of from 0.1 to 10 mass %.

[Additives]

As mentioned above, various additives may be incorporated to the resin compositions for the surface layer (A) and the resin layer (B). Such additives may, for example, be a stabilizer, an ultraviolet absorber, a mold release agent, a flame retardant, a colorant, an antistatic agent, a thermoplastic resin, a thermoplastic elastomer, glass fibers, glass flakes, glass beads, carbon fibers, wollastonite, calcium silicate, aluminum borate whiskers, etc. Among them, it is preferred to incorporate a stabilizer, a mold release agent, an ultraviolet absorber, a flame retardant, etc.

The method for mixing the additives, etc. to the resin compositions for the surface layer (A) and the resin layer (B) is not particularly limited. In the present invention, it may, for example, be a method of mixing the additives, etc. and the polycarbonate resins in a solid state such as pellets or powder, followed by kneading by e.g. an extruder, a method of mixing additives, etc. and the polycarbonate resins in a molten state, or a method of adding the additives, etc. during the polymerization reaction of the raw material monomers in the melt method or the interface method, or upon completion of the polymerization reaction.

<Stabilizer>

The polycarbonate resin composition preferably contains a stabilizer in order to prevent a decrease of the molecular weight or deterioration of the color or transparency during molding, etc.

As such a stabilizer, a phosphorus type stabilizer, a phenol type stabilizer or a sulfur type stabilizer is preferred.

The phosphorus type stabilizer includes, for example, phosphorous acid, phosphoric acid, phosphonous acid and their esters. Specifically, it includes triphenyl phosphite, tris(nonylphenyl)phosphite, tris(2,4-di-tert-butylphenyl) phosphite, tridecyl phosphite, trioctyl phosphite, trioctadecyl phosphite, didecylmonophenyl phosphite, dioctylmonophenyl phosphite, diisopropylmonophenyl phosphite, monobutyldiphenyl phosphite, monodecyldiphenyl phosphite, monooctyldiphenyl phosphite, bis(2,6-di-tert-butyl-4-methylphenyl)pentaerythritol diphosphite, 2,2-methylenebis (4,6-di-tert-butylphenyl)octyl phosphite, bis(nonylphenyl) pentaerythritol diphosphite, bis(2,4-di-tert-butylphenyl)

pentaerythritol diphosphite, distearyl pentaerythritol diphosphite, tributyl phosphate, triethyl phosphate, trimethyl phosphate, triphenyl phosphate, diphenylmonoorthoxenyl phosphate, dibutyl phosphate, dioctyl phosphate, diisopropyl phosphate, tetrakis(2,4-di-tert-butylphenyl) 4,4'-biphenylenediphosphinate, dimethyl benzenephosphonate, diethyl benzenephosphonate, dipropyl benzenephosphonate, etc.

The phenol type stabilizer may, for example, be a hindered phenol type stabilizer such as pentaerythritol tetrakis (3-(3,5-di-tert-butyl-4-hydroxyphenyl)propionate), octadecyl-3-(3,5-di-tert-butyl-4-hydroxyphenyl)propionate, thiodiethylene bis(3-(3,5-di-tert-butyl-4-hydroxyphenyl) propionate) or pentaerythritol tetrakis(3-(3,5-di-neopentyl-4-hydroxyphenyl)propionate). Among them, pentaerythritol tetrakis(3-(3,5-di-tert-butyl-4-hydroxyphenyl)propionate) and octadecyl-3-(3,5-di-tert-butyl-4-hydroxyphenyl)propionate are preferred. These two hindered phenol type stabilizers are commercially available under trade names "Irganox 1010" and "Irganox 1070" from BASF.

As the sulfur type stabilizer, tetrakis[methylene-3-(dodecylthio)propionate]methane, bis[2-methyl-4-{3-n-alkyl($C_{12}$ or $C_{14}$)thiopropionyloxy}-5-tert-butylphenyl]sulfide, di-(tridecyl-thio)-di-propionate, di-(stearyl-thio)-di-propionate, di-(lauryl-thio)-di-propionate, etc., may be exemplified.

These stabilizers may be used alone, or two or more of them may be used in combination.

The content of the stabilizer is preferably at least 0.01 part by mass, more preferably at least 0.02 part by mass and preferably at most 1 part by mass, more preferably at most 0.5 part by mass, further preferably at most 0.2 part by mass, per 100 parts by mass of the total of the polycarbonate resin (a) and the polycarbonate resin (b). If the content of the stabilizer is lower than the lower limit value, the effects to prevent a decrease of the molecular weight or deterioration of the transparency may not be obtainable. On the other hand, if the content of the stabilizer exceeds the upper limit value, the resin composition rather tends to be unstable to heat or moisture.

<Mold Release Agent>

The polycarbonate resin composition preferably contains a mold release agent.

The mold release agent may, for example, be an aliphatic carboxylic acid, a fatty acid ester obtainable by reacting an aliphatic carboxylic acid with an alcohol, an aliphatic hydrocarbon compound having a number average molecular weight of from 200 to 15,000, or a polysiloxane type silicone oil. Among them, a fatty acid ester obtainable by reacting an aliphatic carboxylic acid with an alcohol is preferred.

The aliphatic carboxylic acid to constitute a fatty acid ester may be a saturated or unsaturated aliphatic monovalent, bivalent or trivalent carboxylic acid. Here, an aliphatic carboxylic acid includes an alicyclic carboxylic acid. Among them, a preferred aliphatic carboxylic acid is a $C_{6-36}$ monovalent or bivalent carboxylic acid, and a $C_{6-36}$ saturated aliphatic monovalent carboxylic acid is more preferred. Specific examples of such an aliphatic carboxylic acid include palmitic acid, stearic acid, caproic acid, capric acid, lauric acid, arachic acid, behenic acid, lignoceric acid, cerotic acid, melissic acid, montanic acid, tetratriacontanoic acid, adipic acid, azelaic acid, etc.

The alcohol to constitute a fatty acid ester may, for example, be a saturated or unsaturated monohydric alcohol or a saturated or unsaturated polyhydric alcohol. Such an alcohol may have a fluorine atom or a substituent such as an aryl group. Among such alcohols, a monohydric or polyhydric saturated alcohol having at most 30 carbon atoms is preferred, and a saturated aliphatic monohydric alcohol or polyhydric alcohol having at most 30 carbon atoms is more preferred. Here, an aliphatic alcohol includes an alicyclic alcohol. Specific examples of such an alcohol include octanol, decanol, stearyl alcohol, behenyl alcohol, ethylene glycol, diethylene glycol, glycerin, pentaerythritol, 2,2-dihydroxyperfluoropropanol, neopentylene glycol, ditrimethylolpropane, dipentaerythritol, etc.

Specific examples of the fatty acid ester obtainable by reacting an aliphatic carboxylic acid and an alcohol, include beeswax (a mixture containing myristyl palmitate as the main component), stearic acid stearate, behenic acid behenate, behenic acid stearate, palmitic acid monoglyceride, stearic acid monoglyceride, stearic acid diglyceride, stearic acid triglyceride, pentaerythritol monopalmitate, pentaerythritol monostearate, pentaerythritol distearate, pentaerythritol tristearate, pentaerythritol tetrastearate, etc. Among them, it is more preferred to use at least one mold release agent selected from the group consisting of pentaerythritol tetrastearate, stearic acid stearate and stearic acid monoglyceride.

The content of the mold release agent is preferably at least 0.05 part by mass, more preferably at least 0.1 part by mass, per 100 parts by mass of the total of the polycarbonate resin (a) and the polycarbonate resin (B), and the upper limit is preferably 1 part by mass, more preferably 0.6 part by mass, further preferably 0.4 part by mass. If the content of the mold release agent is less than the lower limit value, the mold releasing effects may not be sufficiently obtainable. On the other hand, if the content of the mold release agent exceeds the upper limit value, a decrease of the hydrolysis resistance or contamination of the mold during the molding is likely to result.

<Ultraviolet Absorber>

The polycarbonate resin composition of the present invention preferably contains an ultraviolet absorber. Especially when the ultraviolet absorber is used in combination with the above-mentioned phosphorus type stabilizer and/or a phenol type stabilizer, the weather resistance tends to be readily improved.

The ultraviolet absorber may, for example, be an organic ultraviolet absorber such as a benzotriazole compound, a benzophenone compound, a salicylate compound, a cyanoacrylate compound, a triazine compound, an oxanilide compound, a malonate compound or a hindered amine compound. Among them, a benzotriazole type ultraviolet absorber, a triazine type ultraviolet absorber or a malonate type ultraviolet absorber is preferred.

The addition of the ultraviolet absorber is particularly effective in the polycarbonate resin (a), and rather than to the polycarbonate resin (b), the effect to improve the weather resistance is better, and it is observed that a change in color is less.

Specific examples of the benzotriazole type ultraviolet absorber include, for example, 2-(2'-hydroxy-5'-methylphenyl)benzotriazole, 2-[2'-hydroxy-3',5'-bis(α,α-dimethylbenzyl)phenyl]-benzotriazole, 2-(2'-hydroxy-3',5'-di-tert-butylphenyl)-benzotriazole, 2-(2'-hydroxy-3'-tert-butyl-5'-methylphenyl)-5-chlorobenzotriazole, 2-(2'-hydroxy-3',5'-di-tert-butyl-phenyl)-5-chlorobenzotriazole, 2-(2'-hydroxy-3',5'-di-tert-butyl-amyl)-benzotriazole, 2-(2'-hydroxy-5'-tert-octylphenyl)benzotriazole, 2,2'-methylenebis[4-(1,1,3, 3-tetramethylbutyl)-6-(2N-benzotriazol-2-yl)phenol], etc. Among them, 2-(2'-hydroxy-5'-tert-octylphenyl)benzotriazole or 2,2'-methylenebis[4-(1,1,3,3-tetramethylbutyl)-6-

(2N-benzotriazol-2-yl)phenol] is preferred, and 2-(2'-hydroxy-5'-tert-octylphenyl)benzotriazole is particularly preferred.

Specific examples of the triazine type ultraviolet absorber include 2,4-diphenyl-6-(2-hydroxy-4-methoxyphenyl)-1,3,5-triazine, 2,4-diphenyl-6-(2-hydroxy-4-ethoxyphenyl)-1,3,5-triazine, 2,4-diphenyl-6-(2-hydroxy-4-propoxyphenyl)-1,3,5-triazine, 2,4-diphenyl-6-(2-hydroxy-4-butoxyphenyl)-1,3,5-triazine, 2,4-diphenyl-6-(2-hydroxy-4-hexyloxyphenyl)-1,3,5-triazine, 2,4-diphenyl-6-(2-hydroxy-4-octyloxyphenyl)-1,3,5-triazine, 2,4-diphenyl-6-(2-hydroxy-4-dodecyloxyphenyl)-1,3,5-triazine, 2,4-diphenyl-6-(2-hydroxy-4-benzyloxyphenyl)-1,3,5-triazine, 2,4-diphenyl-6-(2-hydroxy-4-butoxyethoxyphenyl)-1,3,5-triazine, etc.

Specific examples of the malonate ultraviolet absorber include 2-(alkylidene) malonates, particularly 2-(1-arylalkylidene)malonates. Specifically, "PR-25" manufactured by Clariant (Japan) K.K. or "B-CAP" manufactured by BASF may, for example, be mentioned.

The content of the ultraviolet absorber is preferably at least 0.05 part by mass, more preferably at least 0.1 part by mass and preferably at most 5 parts by mass, more preferably at most 4 parts by mass, further preferably at most 3 parts by mass, per 100 parts by mass of the total of the polycarbonate resins (a) and (b). If the content of the ultraviolet absorber is less than the lower limit value, the effect to improve the weather resistance is likely to be inadequate. On the other hand, if the content of the ultraviolet absorber exceeds the upper limit value, for example, at the time of extrusion molding, volatile gas, etc. are likely to be formed, thus leading to contamination of a takeoff roll.

Especially in a case where the resin layer (B) contains an ultraviolet absorber, the content per 100 parts by mass of the total of the polycarbonate resins (a) and (b) is preferably from 0.01 to 1 part by mass, more preferably from 0.05 to 0.7 part by mass, further preferably from 0.1 to 0.5 part by mass.

Whereas in a case where the surface layer (A) contains an ultraviolet absorber, the content per 100 parts by mass of the total of the polycarbonate resins (a) and (b) is preferably from 1 to 5 parts by mass, more preferably from 1.5 to 4.5 parts by mass, further preferably from 2 to 4 parts by mass.

<Flame Retardant>

The polycarbonate resin laminate of the present invention may contain a flame retardant. The flame retardant to be used, may, for example, be at least one member selected from the group consisting of a sulfonic acid metal salt type flame retardant, a halogenated compound type flame retardant, a phosphorus-containing compound type flame retardant and a silicon-containing compound type flame retardant. Among them, a sulfonic acid metal salt type flame retardant is preferred.

The amount of the flame retardant to be incorporated is usually preferably at least 0.01 part by mass, more preferably at least 0.05 part by mass, per 100 parts by mass of the total of the polycarbonate resins (a) and (b). If the amount of the flame retardant to be incorporated is excessively small, the effect for flame retardancy tends to decrease. If the amount of the flame retardant to be incorporated is excessively large, the mechanical properties or flame retardancy of the resin laminate is likely to be lowered, or the transparency tends to be lowered, and the upper limit of the amount to be incorporated is preferably 40 parts by mass, more preferably 30 parts by mass.

The sulfonic acid metal salt type flame retardant may be an aliphatic sulfonic acid metal salt or an organic sulfonic acid metal salt. The metal for such a metal salt may, for example, be a Group 1 metal of the long form of periodic table, such as sodium, lithium, potassium, rubidium or cesium, a magnesium such as beryllium or magnesium, or a Group 2 metal of the long form of periodic table, such as calcium, strontium or barium. Sulfonic acid metal salts may be used alone, or two or more of them may be used in combination. The sulfonic acid metal salt may, for example, be an aromatic sulfone sulfonic acid metal salt or a perfluoroalkane-sulfonic acid metal salt.

The sulfonic acid metal salt type flame retardant is incorporated in an amount of preferably from 0.04 to 0.3 part by mass, more preferably from 0.05 to 0.2 part by mass, per 100 parts by mass of the total of the above-mentioned polycarbonate resins (a) and (b).

Specific examples of the aromatic sulfone sulfonic acid metal salt include, for example, sodium diphenylsulfone-3-sulfonate, potassium diphenylsulfone-3-sulfonate, sodium 4,4'-dibromodiphenyl-sulfone-3-sulfonate, potassium 4,4'-dibromodiphenyl-sulfone-3-sulfonate, calcium 4-chloro-4'-nitrophenylsulfone-3-sulfonate, disodium diphenylsulfone-3,3'-disulfonate, dipotassium diphenylsulfone-3,3'-disulfonate, etc.

Specific examples of the perfluoroalkane-sulfonic acid metal salt include sodium perfluorobutane-sulfonate, potassium perfluorobutane-sulfonate, sodium perfluoromethylbutane-sulfonate, potassium perfluoromethylbutane-sulfonate, sodium perfluorooctane-sulfonate, potassium perfluorooctane-sulfonate, a tetraethyl ammonium salt of perfluorobutane-sulfonic acid, etc.

Specific examples of the halogenated compound type flame retardant include, for example, tetrabromobisphenol A, tribromophenol, brominated aromatic triazine, tetrabromobisphenol A epoxy oligomer, tetrabromobisphenol A epoxy polymer, decabromophenyl oxide, tribromoallyl ether, tetrabromobisphenol A carbonate oligomer, ethylenebistetrabromophthalimide, decabromodiphenylethane, brominated polystyrene, hexabromocyclododecane, etc.

The halogenated compound type flame retardant is incorporated in an amount of preferably from 5 to 30 parts by mass, more preferably from 10 to 25 parts by mass, per 100 parts by mass of the total of the above-mentioned polycarbonate resins (a) and (b).

The phosphorus-containing compound type flame retardant may, for example, be red phosphorus, coated red phosphorus, a polyphosphoric acid salt type compound, a phosphoric acid ester type compound or a phosphazene type compound. Specific examples of the phosphoric acid ester compound include, for example, trimethyl phosphate, triethyl phosphate, tributyl phosphate, trioctyl phosphate, tributoxyethyl phosphate, triphenyl phosphate, tricresyl phosphate, cresyldiphenyl phosphate, octyldiphenyl phosphate, diisopropylphenyl phosphate, tris(chloroethyl)phosphate, tris(dichloropropyl)phosphate, tris(chloropropyl) phosphate, bis(2,3-dibromopropyl)-2,3-dichloropropyl phosphate, tris(2,3-dibromopropyl)phosphate, bis(chloropropyl)monooctyl phosphate, bisphenol A bisphosphate, hydroquinone bisphosphae, resorcin bisphosphate, trioxybenzene triphosphate, etc.

The phosphorus-containing compound type flame retardant is incorporated in an amount of preferably from 3 to 15 parts by mass, more preferably from 5 to 25 parts by mass, most preferably from 10 to 12 parts by mass, per 100 parts by mass of the total of the above-mentioned polycarbonate resins (a) and (b).

The silicon-containing compound type flame retardant may, for example, be silicone varnish, a silicone resin wherein substituents bonded to silicon atoms comprise aromatic hydrocarbon groups and aliphatic hydrocarbon groups having at least two carbon atoms, a silicone compound wherein the main chain has a branched structure and it has an aromatic group in an organic functional group contained, a silicone powder having a polydiorganosiloxane polymer supported, which may have functional groups on the surface of the silica powder, or an organopolysiloxane/polycarbonate copolymer.

The polycarbonate resin laminate of the present invention is one containing a specific amount of the polycarbonate resin (a) having structural units represented by the above-mentioned formula (1), and by combining such a laminate with the flame retardant, the flame retardancy will be improved, for example, as compared with a laminate formed from a resin composition employing a polycarbonate resin (which is referred to as "A-PC") obtainable by using bisphenol A as a raw material monomer.

The reason as to why the flame retardancy of the polycarbonate resin laminate of the present invention is improved, is not clear, but is considered to be as follows, when a case is taken as an example wherein as a polycarbonate resin component, a polycarbonate resin (which is referred to as "C-PC") obtained by using, as a raw material monomer, an aromatic dihydroxy compound i.e. 2,2-bis(3-methyl-4-hydroxyphenyl)propane, is used.

That is, it is considered that due to branched structures formed from structural units of at least one type selected from structural units derived from the compound represented by the above formula (8), structural units derived from the compound represented by the above formula (9) and structural units derived from the compound represented by the above formula (10), which the polycarbonate resin of the present invention has, the viscosity in a low shearing region tends to be high, whereby the combustion droplets (drips) in a combustion test are suppressed and thus, the flame retardancy is improved. Further, C-PC, etc. are likely to have molecular chains broken and their decomposition is fast, as compared with A-PC, since they have a methyl group on a benzene ring forming the structure. Accordingly, C-PC, etc. are quickly decomposed and graphitized to form a heat-insulating layer (char), whereby the flame retardancy is readily obtainable. The heat decomposition initiation temperature of C-PC, etc. being low as compared with A-PC is considered to be attributable to an influence of the difference in structure such that, of the bisphenol structure, "3-positions in two benzene rings are substituted by methyl groups".

EXAMPLES

Now, the present invention will be described in further detail with reference to Examples, but it should be understood that the present invention is by no means restricted by the following Examples.

The physical properties of polycarbonate resins, polycarbonate resin laminates and polycarbonate resin sheets used in Examples were evaluated by the following methods.
(1) Pencil Hardness
  (1-1) Pencil hardness of polycarbonate resin
  A polycarbonate resin was injection-molded into a molded product having a thickness of 3 mm and a size of 60 mm×60 mm by an injection molding machine (J50E2, manufactured by the Japan Steel Works, Ltd.) under conditions of a barrel temperature of 280° C. and a mold temperature of 80° C. With respect to the molded product, the pencil hardness was measured under a load of 750 g by means of a pencil hardness tester (manufactured by Toyo Seiki Seisaku-sho, Ltd.) in accordance with ISO15184.
  (1-2) Pencil hardness of polycarbonate resin laminate
  With respect to a polycarbonate resin laminate, the pencil hardness was measured under a load of 750 g by means of a pencil hardness tester (manufactured by Toyo Seiki Seisaku-sho, Ltd.) in accordance with ISO15184. Here, with respect to the polycarbonate resin laminate, the measurement was made from the surface side on the surface layer (A) side.
(2) Viscosity Average Molecular Weight (Mv) of Polycarbonate Resin
  A polycarbonate resin was dissolved in methylene chloride (concentration: 6.0 g/L (liters)), the specific viscosity ($\eta_{sp}$) at 20° C. was measured by using an Ubbelohde viscosity tube, and the viscosity average molecular weight (Mv) was calculated in accordance with the following formula. In the following formulae, C represents the concentration, and [η] represents the intrinsic viscosity.

$$\eta_{sp}/C=[\eta](1+0.28\ \eta_{sp})$$

$$[\eta]=1.23\times10^{-4}Mv^{0.83}$$

(3) Color of Polycarbonate Resin Laminate
  (3-1) Visual observation From the surface layer (A) side of a polycarbonate resin laminate, the color of the laminate was visually observed. Evaluation was made on such a basis that one which is transparent and close to colorless is rated as "○", one which is transparent but slightly colored yellow, is rated as "Δ", and one which is dull and colored yellow is rated as "x".
  (3-2) Yellowness index (solution YI)
  A polycarbonate resin laminate was dissolved in methylene chloride (special grade chemical methylene chloride, manufactured by Hayashi Pure Chemical Ind., Ltd.) to obtain a 7 mass % methylene chloride solution. Then, the methylene chloride solution was put into a quartz cell having an inside width of 50 mm, and the yellowness index (solution YI) was measured by a color-difference meter (SM color computer, SM-4-2, manufactured by Suga Test Instruments Co., Ltd.). The smaller the numerical value, the better the color tone.
(4) Surface Impact
  (4-1) Surface impact strength
  With respect to a polycarbonate resin laminate, in accordance with ASTM D2794, using "Dupont impact strength tester" manufactured by Toyou Seiki Seisaku-sho, Ltd., one having a crack formed was evaluated as "breakage", and the test was repeated 10 times, whereupon the 50% breaking energy was obtained. At that time, the impact shaft radius was ¹⁄₁₆ inch, the weight was 133 g, and the measurement was made at a temperature of 25° C. Further, "NB" in Table 1 indicates that no breakage was observed in the test of 10 times.
  (4-2) Dupont impact strength
  The Dupont impact strength of a polycarbonate resin laminate was carried out in accordance with ASTM D-2794-64 using "Dupont impact strength tester" manufactured by Toyou Seiki Seisaku-sho, Ltd. Here, the impact shaft radius was ¼ inch, and as the impact base, a cylindrical impact base having an outer diameter of 70 mm and an inner diameter of 50 mm was used. As the weight, a proper weight depending upon the impact resistance of each laminate was selected for use from 100 g, 300 g, 500 g, 1,000 g and 2,000 g. The number of times n of the test was from 6 to 10, and the 50% breaking height was measured, whereupon the impact energy was calculated from the breaking height and the weight used. Further, "NB" in Table 22 indicates that no breakage was observed in all the test.

(5) Number of foreign matters (5-1) Number of foreign matters of at Least 300 μm in a polycarbonate resin single Layer Sheet With respect to a single layer sheet of a polycarbonate resin having a thickness of 200 μm, by visual observation and by means of a microscope, the number of foreign matters having diameters of at least 300 μm was counted, and evaluated as the number per 1 m².

(5-2) Number of foreign matters of at least 300 μm in a polycarbonate resin laminate With respect to a polycarbonate resin laminate, by visual observation and by means of a microscope, the number of foreign matters having diameters of at least 300 μm was counted, and evaluated as the number per 1 m².

Preparation Example 1

Polycarbonate Resin (PC(1)) (BPC Homopolymer) (Melt Method)

To 37.60 kg (about 147 mol) of 2,2-bis(4-hydroxy-3-methylphenyl)propane (hereinafter sometimes referred to simply as "BPC") (manufactured by HONSHU CHEMICAL INDUSTRY CO., LTD.) and 32.20 kg (about 150 mol) of diphenyl carbonate (hereinafter sometimes referred to simply as DPC), an aqueous solution of cesium carbonate was added so that cesium carbonate would be 2 μmol per 1 mol of the dihydroxy compound to prepare a mixture. Then, the mixture was charged into a first reactor having an internal volume of 200 L (liters) equipped with a stirring machine, a heat medium jacket, a vacuum pump and a reflux condenser.

Then, an operation of reducing the pressure in the first reactor to 1.33 kPa (10 Torr) and then restoring it to the atmospheric pressure by nitrogen was repeatedly carried out five times, and then the interior in the first reactor was replaced with nitrogen. After replacement with nitrogen, a heat medium at a temperature of 230° C. was passed through the heat medium jacket to gradually increase the internal temperature in the first reactor thereby to dissolve the mixture. Then, the stirring machine was rotated at 55 rpm, and the temperature in the heat medium jacket was controlled to keep the internal temperature of the first reactor at 220° C. Then, while phenol formed as a by-product by an oligomerization reaction of BPC and DPC conducted in the interior of the first reactor was distilled off, the pressure in the first reactor was reduced from 101.3 kPa (760 Torr) to 13.3 kPa (100 Torr) by absolute pressure over a period of 40 minutes.

Then, the pressure in the first reactor was maintained at 13.3 kPa, and while phenol was further distilled off, a transesterification was carried out for 80 minutes.

Then, the interior of the system was restored to 101.3 kPa by absolute pressure by nitrogen and then pressurized to 0.2 MPa by gauge pressure, and via a transport pipe line preliminarily heated to at least 200° C., the oligomer in the first reactor was pneumatically transported to a second reactor. Here, the second reactor had an internal volume of 200 L and equipped with a stirring machine, a heat medium jacket, a vacuum pump and a reflux condenser, and the internal pressure was controlled to be the atmospheric pressure and the internal temperature was controlled to be 240° C.

Then, the oligomer pneumatically transported into the second reactor was stirred at 16 rpm, the internal temperature was raised by the heat medium jacket, and the interior of the second reactor was vacuumed from 101.3 kPa to 13.3 kPa by absolute pressure over a period of 40 minutes. Thereafter, the temperature raising was continued, and further over a period of 40 minutes, the internal pressure was reduced from 13.3 kPa to 399 Pa (3 Torr) by absolute pressure, to remove distilled phenol out of the system. Further, the temperature raising was continued, and when the absolute pressure in the interior of the second reactor reached 70 Pa (about 0.5 Torr), the polycondensation reaction was carried out while maintaining 70 Pa. The final internal temperature in the second reactor was 295° C. When the stirring machine of the second reactor reached a predetermine stirring power, the polycondensation reaction was terminated.

Then, the interior of the second reactor was restored to 101.3 kPa by absolute pressure by nitrogen and then pressurized to 0.2 MPa by gauge pressure, and from the bottom of the second reactor, a polycarbonate resin was withdrawn in the form of strands and, while being cooled in a water bath, pelletized by means of a rotary cutter. The BPC homopolymer of the obtained polycarbonate resin (hereinafter sometimes referred to simply as "PC(1)" had a My of 30,000 and a pencil hardness of H, and the content of the compound represented by the formula (10) was 420 ppm, the content of the compound represented by the formula (8) was 180 ppm, and the content of the compound represented by the formula (9) was 1,850 ppm.

Preparation Example 2

Polycarbonate Resin (PC(2)) (BPA Homopolymer)

A commercially available polycarbonate resin (trade name "Iupilon S-3000R", manufactured by Mitsubishi Engineering-Plastics Corporation) prepared by an interface method and constituted solely by structural units derived from 2,2-bis(4-hydroxyphenyl)propane (BPA), was used.

This polycarbonate resin (hereinafter sometimes referred to simply as PC(2)) had a viscosity average molecular weight (Mv) of 22,000 and a pencil hardness of B. The content of the compound represented by the formula (10) was 0 ppm, the content of the compound represented by the formula (8) was 0 ppm, and the content of the compound represented by the formula (9) was 0 ppm.

Preparation Example 3

Polycarbonate Resin (PC(3)) (BPA/BPC Copolymer) (Melt Method)

A polycarbonate resin (BPA/BPC copolymer) was prepared in the same manner as the above polycarbonate resin (a) except that BPA and BPC were charged in the predetermined amounts so as to be 45 mol/55 mol. The final internal temperature in the second reactor was 285° C. The obtained polycarbonate resin (BPA/BPC copolymer, hereinafter sometimes referred to simply as PC(3)) had a Mv of 28,000 and a pencil hardness of F, and the content of the compound represented by the formula (10) was 190 ppm, the content of the compound represented by the formula (8) was 130 ppm, and the content of the compound represented by the formula (9) was 920 ppm.

Preparation Example 11

Polycarbonate Resin (PC(11)) (BPC Homopolymer) (Melt Method)

To 37.60 kg (about 147 mol) of 2,2-bis(4-hydroxy-3-methylphenyl)propane (BPC) (manufactured by HONSHU CHEMICAL INDUSTRY CO., LTD.) and 32.20 kg (about 150 mol) of diphenyl carbonate (DPC), an aqueous solution of cesium carbonate was added so that cesium carbonate would be 2 μmol per 1 mol of the dihydroxy compound to prepare a mixture. Then, the mixture was charged into a first reactor having an internal volume of 200 L equipped with a stirring machine, a heat medium jacket, a vacuum pump and a reflux condenser.

Then, an operation of reducing the pressure in the first reactor to 1.33 kPa (10 Torr) and then restoring it to the atmospheric pressure by nitrogen was repeatedly carried out five times, and then the interior in the first reactor was replaced with nitrogen. After replacement with nitrogen, a heat medium at a temperature of 230° C. was passed through the heat medium jacket to gradually increase the internal temperature in the first reactor thereby to dissolve the mixture. Then, the stirring machine was rotated at 55 rpm, and the temperature in the heat medium jacket was controlled to keep the internal temperature of the first reactor at 220° C. Then, while phenol formed as a by-product by an oligomerization reaction of BPC and DPC conducted in the interior of the first reactor was distilled off, the pressure in the first reactor was reduced from 101.3 kPa (760 Torr) to 13.3 kPa (100 Torr) by absolute pressure over a period of 40 minutes.

Then, the pressure in the first reactor was maintained at 13.3 kPa, and while phenol was further distilled off, a transesterification was carried out for 80 minutes.

Then, the interior of the system was restored to 101.3 kPa by absolute pressure by nitrogen and then pressurized to 0.2 MPa by gauge pressure, and via a transport pipe line preliminarily heated to at least 200° C., the oligomer in the first reactor was pneumatically transported to a second reactor. Here, the second reactor had an internal volume of 200 L and equipped with a stirring machine, a heat medium jacket, a vacuum pump and a reflux condenser, and the internal pressure was controlled to be the atmospheric pressure and the internal temperature was controlled to be 240° C.

Then, the oligomer pneumatically transported into the second reactor was stirred at 16 rpm, the internal temperature was raised by the heat medium jacket, and the interior of the second reactor was vacuumed from 101.3 kPa to 13.3 kPa by absolute pressure over a period of 40 minutes. Thereafter, the temperature raising was continued, and further over a period of 40 minutes, the internal pressure was reduced from 13.3 kPa to 399 Pa (3 Torr) by absolute pressure, to remove distilled phenol out of the system. Further, the temperature raising was continued, and when the absolute pressure in the interior of the second reactor reached 70 Pa (about 0.5 Torr), the polycondensation reaction was carried out while maintaining 70 Pa. The final internal temperature in the second reactor was 285° C. When the stirring machine of the second reactor reached a predetermine stirring power, the polycondensation reaction was terminated.

Then, the interior of the second reactor was restored to 101.3 kPa by absolute pressure by nitrogen and then pressurized to 0.2 MPa by gauge pressure, and from the bottom of the second reactor, a polycarbonate resin was withdrawn in the form of strands and, while being cooled in a water bath, pelletized by means of a rotary cutter. The obtained polycarbonate resin (hereinafter sometimes referred to simply as PC(11)) had a Mv of 31,800 and a pencil hardness of 2H, and the content of the compound represented by the formula (10) was 420 ppm, the content of the compound represented by the formula (8) was 180 ppm, and the content of the compound represented by the formula (9) was 1,850 ppm.

Preparation Example 12

Polycarbonate Resin (PC(12)) (BPA Homopolymer)

As a BPA homopolymer, a commercially available polycarbonate resin (trade name "Novalex M7027J", manufactured by Mitsubishi Engineering-Plastics Corporation) prepared by a melt method and constituted solely by monomer units derived from bisphenol A (BPA), was used. This BPA homopolymer (hereinafter sometimes referred to simply as PC(12)) had a Mv of 25,600 and a pencil hardness of 2B. The content of the compound represented by the formula (10) was 0 ppm, the content of the compound represented by the formula (8) was 0 ppm, and the content of the compound represented by the formula (9) was 0 ppm.

Preparation Example 21

Polycarbonate Resin (PC(21)) (BPC Homopolymer)

360 parts by mass of BPC (manufactured by HONSHU CHEMICAL INDUSTRY CO., LTD.) as the raw material dihydroxy compound, 585.1 parts by mass of a 25 mass % sodium hydroxide (NaOH) aqueous solution and 1,721.5 parts by mass of water were dissolved at 40° C. in the presence of 0.41 part by mass of hydrosulfite and then cooled to 20° C. to obtain a BPC aqueous solution. 8.87 kg/hr of this BPC aqueous solution and 4.50 kg/hr of methylene chloride were introduced to a 1.8 L first reactor made of glass and equipped with a reflux condenser, a stirring machine and a cooling medium jacket and contacted with phosgene at room temperature separately introduced at a rate of 0.672 kg/hr. The reaction temperature at that time reached 35° C.

Then, by an overflow tube attached to the reactor, this reaction liquid/reaction gas was introduced to a second reactor (1.8 L) having the same shape as the first reactor and reacted. To the second reactor, separately, as a molecular weight-adjusting agent, 0.21 kg/hr of p-t-butylphenol (8 mass % methylene chloride solution) was introduced. Then, from an overflow tube attached to the second reactor, the reaction liquid/reaction gas was introduced to an oligomerization vessel (4.5 L) having the same shape as the first reactor. To the oligomerization vessel, separately, as a catalyst, 0.020 kg/hr of a 2 mass % trimethylamine aqueous solution was introduced. Then, the oligomerized emulsion thus obtained was further led to a liquid separation vessel (settler) having an internal volume of 5.4 L, and an aqueous phase and an oil phase were separated to obtain a methylene chloride solution of the oligomer.

2.60 kg from the above methylene chloride solution of the oligomer was charged to a reaction vessel provided with paddle vanes, and 2.44 kg of methylene chloride for dilution was added thereto, and further, 0.278 kg of a 25 mass % sodium hydroxide aqueous solution, 0.927 kg of water, 8.37 g of a 2 mass % triethylamine aqueous solution and 2.01 g of p-t-butylphenol were added, followed by stirring at 10° C. to carry out a polycondensation reaction for 180 minutes.

3.12 kg from the above polycondensation reaction liquid was charged to a 5.4 L reaction vessel provided with paddle vanes, and 2.54 kg of methylene chloride and 0.575 kg of water were added thereto, followed by stirring for 15 minutes, whereupon the stirring was stopped, and an aqueous phase and an organic phase were separated. To the separated organic phase, 1.16 kg of 0.1 N hydrochloric acid was added, followed by stirring for 15 minutes, to extract triethylamine and an alkali component remaining in a very small amount, whereupon the stirring was stopped, and an aqueous phase and an organic phase were separated. Further, to the separated organic phase, 1.16 g of pure water was added, followed by stirring for 15 minutes, whereupon the stirring was stopped, and an aqueous phase and an organic phase were separated. This operation was repeated three times.

The obtained polycarbonate solution was fed into warm water of from 60 to 75° C. and thereby powdered, followed by drying to obtain a powder-form polycarbonate resin. The obtained polycarbonate resin (hereinafter sometimes referred to simply as PC(21) had a Mv of 30,000 and a pencil hardness of 2H. The content of the compound represented by the formula (10) was 0 ppm, the content of the compound represented by the formula (8) was 0 ppm, and the content of the compound represented by the formula (9) was 0 ppm.

Preparation Example 22

Polycarbonate Resin (PC(22)) (BPC Homopolymer)

The preparation was carried out in the same manner as in Preparation Example 11 except that the predetermined stirring power of the stirring machine of the second reactor was changed. The obtained polycarbonate resin (hereinafter sometimes referred to simply as PC(22)) had a Mv of 24,000 and a pencil hardness of 2H, and the content of the compound represented by the formula (10) was 50 ppm, the content of the compound represented by the formula (8) was 40 ppm, and the content of the compound represented by the formula (9) was 850 ppm.

Preparation Example 23

Polycarbonate Resin (PC(23)) (BPA Homopolymer)

As a BPA homopolymer, a commercially available polycarbonate resin (trade name "Novalex M7022J", manufactured by Mitsubishi Engineering-Plastics Corporation) prepared by a melt method and constituted solely by monomer units derived from bisphenol A (BPA), was used. This BPA homopolymer (hereinafter sometimes referred to simply as PC(23)) had a Mv of 20,400 and a pencil hardness of 2B. The content of the compound represented by the formula (10) was 0 ppm, the content of the compound represented by the formula (8) was 0 ppm, and the content of the compound represented by the formula (9) was 0 ppm.

Preparation Example 24

Polycarbonate Resin (PC(24)) BPC/BPA (75/25 (Wt %)) Copolymer

The preparation was carried out in the same manner as in Preparation Example 11 except that as the raw material dihydroxy compound, instead of BPC, 25.95 kg of BPC (manufactured by HONSHU CHEMICAL INDUSTRY CO., LTD.) and 8.65 kg of BPA (manufactured by Mitsubishi Chemical Corporation) were used and the predetermined stirring power of the stirring machine of the second reactor was changed, to obtain a polycarbonate resin. The obtained polycarbonate resin (hereinafter sometimes referred to simply as PC(24)) had a Mv of 21,200 and a pencil hardness of H, and the content of the compound represented by the formula (10) was 80 ppm, the content of the compound represented by the formula (8) was 70 ppm, and the content of the compound represented by the formula (9) was 1,200 ppm.

Preparation Example 25

Polycarbonate Resin (PC(25)) (BPC Homopolymer)

To 181.8 kg of 2,2-bis(4-hydroxy-3-methylphenyl)propane (BPC) (manufactured by HONSHU CHEMICAL INDUSTRY CO., LTD.) and 157.7 kg of diphenyl carbonate (DPC), an aqueous solution of cesium carbonate was added so that cesium carbonate would be 2 μmol per 1 mol of the dihydroxy compound to prepare a mixture. Then, the mixture was charged into a first reactor having an internal volume of 400 L equipped with a stirring machine, a heat medium jacket, a vacuum pump and a reflux condenser.

Then, an operation of reducing the pressure in the first reactor to 1.33 kPa (10 Torr) and then restoring it to the atmospheric pressure by nitrogen was repeatedly carried out ten times, and then the interior in the first reactor was replaced with nitrogen. After replacement with nitrogen, a heat medium at a temperature of 230° C. was passed through the heat medium jacket to gradually increase the internal temperature in the first reactor thereby to dissolve the mixture. Then, this molten mixture was transported to a second reactor. Here, the second reactor had an internal volume of 400 L and equipped with a stirring machine, a heat medium jacket, a vacuum pump and a reflux condenser. The stirring machine was rotated at 60 rpm, and the temperature in the heat medium jacket was controlled to maintain the internal temperature of the second reactor at 220° C. And, while distilling off phenol formed as a by-product by oligomerization reaction of BPC and DPC conducted in the interior of the second reactor, the pressure in the first reactor was reduced from 101.3 kPa (760 Torr) to 13.3 kPa (100 Torr).

Then, the second reactor was stirred at 30 rpm, the internal temperature was raised by the heat medium jacket, and the interior of the second reactor was vacuumed from 101.3 kPa to 13.3 kPa by absolute pressure. Thereafter, the temperature raising was continued, and the internal pressure was reduced from 13.3 kPa to 399 Pa (3 Torr) by absolute pressure, to remove distilled phenol out of the system. Further, the temperature raising was continued, and when the absolute pressure in the second reactor reached 70 Pa (about 0.5 Torr), the polycondensation reaction was carried out while maintaining 70 Pa. At that time, the stirring rotational speed was adjusted to 10 rpm depending upon the stirring power, and the final internal temperature in the second reactor was adjusted to be 306° C. When the stirring machine of the second reactor reached a predetermine stirring power, the polycondensation reaction was terminated. The obtained polycarbonate resin (hereinafter sometimes referred to simply as PC(25)) had a My of 34,800 and a pencil hardness of 2H, and the content of the compound represented by the formula (10) was 861 ppm, the content of the compound represented by the formula (8) was 1,291 ppm, and the content of the compound represented by the formula (9) was 7,569 ppm.

Examples 1 to 8 and Comparative Examples 1 to 9

In a ratio as identified in Table 1, BPC homopolymer (PC(1)), BPA homopolymer (PC(2)) and BPA/BPC copolymer (PC(3)) obtained in Preparation Examples 1 to 3 were melt-kneaded by a single screw extruder (VS-40) manufactured by Tanabe Plastics Machinery Co., Ltd., extruded in the form of strands from the outlet of the single screw extruder, solidified by cooling with water and cut and pelletized by a rotary cutter to obtain polycarbonate resin composition pellets.

The barrel temperature of the single screw extruder was 280° C., and the resin temperature at the outlet of the single screw extruder was 300° C.

Then, the obtained polycarbonate resin composition pellets were injection-molded by means of an injection molding machine (SE100DU) manufactured by Sumitomo Heavy Industries, Ltd. at a set temperature of 270° C. and at a mold temperature of 80° C. to obtain sheet-form test pieces having a size of 100 mm×100 mm and a thickness as identified in Table 1.

Such sheets were laminated by means of an epoxy type adhesive (trade name: Araldite, manufactured by Nichiban Co., Ltd.) to obtain a laminate having a layer structure as identified in Table 1.

With respect to the obtained polycarbonate resin laminate, various evaluations were carried out in accordance with the methods described in the above evaluation items. The results are shown in Table 1.

a rotary cutter to obtain polycarbonate resin pellets. At that time, the barrel temperature of the twin screw extruder was 280° C., and the polycarbonate resin temperature at the outlet of the twin screw extruder was 300° C. At the time of melt-kneading, the vent port of the twin screw extruder was connected to a vacuum pump, and the pressure at the vent port was controlled to be 500 Pa.

Then, the obtained polycarbonate resin pellets and BPA homopolymer (PC(12)) were, respectively, melted in a ϕ25 mm single screw extruder (manufactured by Soken Industries Co., Ltd.) for the surface layer (A) and in a ϕ30 mm single screw extruder (manufactured by Soken Industries Co., Ltd.) for the resin layer (B), extruded from a double layer T die attached to the forward ends of both single screw extruders, and cooled by a roll to obtain a laminate of polycarbonate resins. Here, the molding temperature at the time of extrusion molding and the roll temperature are as identified in Table 11. With respect to the obtained polycarbonate resin laminate, the pencil hardness, the solution YI and the Dupont impact strength were evaluated in accordance with the methods described in the above evaluation items. The results are shown in Table 11.

Comparative Example 11

BPC homopolymer (PC(11)) and BPA homopolymer (PC(12)) were, respectively, melted in a ϕ25 mm single screw

TABLE 1

| | Surface layer (A) | | | Resin layer (B) | | | Evaluation results | | |
|---|---|---|---|---|---|---|---|---|---|
| | PC(1) mass ratio | PC(2) mass ratio | Thickness (μm) | PC(1) mass ratio | PC(2) mass ratio | Thickness (μm) | Pencil hardness | Color | Surface impact strength (J) |
| Ex. 1 | 95 | 5 | 600 | 5 | 95 | 2,000 | 2H | ○ | NB |
| Ex. 2 | 90 | 10 | 600 | 5 | 95 | 2,000 | 2H | ○ | NB |
| Ex. 3 | 90 | 10 | 600 | 10 | 90 | 2,000 | 2H | ○ | NB |
| Ex. 4 | 90 | 10 | 600 | 20 | 80 | 2,000 | 2H | ○ | NB |
| Ex. 5 | 75 | 25 | 600 | 10 | 90 | 2,000 | 2H | ○ | NB |
| Ex. 6 | 55 | 45 | 600 | 10 | 90 | 2,000 | H | ○ | NB |
| Ex. 7 | 55 | 45 | 1,000 | 10 | 90 | 2,000 | H | ○ | NB |
| Ex. 8 | 55 | 45 | 600 | 20 | 80 | 2,000 | H | ○ | NB |
| Comp. Ex. 1 | 38 | 62 | 600 | 10 | 90 | 2,000 | HB | ○ | NB |
| Comp. Ex. 2 | 38 | 62 | 600 | 10 | 90 | 2,000 | HB | ○ | NB |
| Comp. Ex. 3 | 20 | 80 | 600 | 10 | 90 | 2,000 | B | ○ | NB |
| Comp. Ex. 4 | 10 | 90 | 600 | 10 | 90 | 2,000 | B | ○ | NB |
| Comp. Ex. 5 | 5 | 95 | 600 | 5 | 95 | 2,000 | 2B | ○ | NB |
| Comp. Ex. 6 | 10 | 90 | 600 | 90 | 10 | 2,000 | HB | Δ | 4 |
| Comp. Ex. 7 | 10 | 90 | 600 | 75 | 25 | 2,000 | HB | Δ | 35 |
| Comp. Ex. 8 | 10 | 90 | 600 | 62 | 38 | 2,000 | HB | Δ | NB |
| Comp. Ex. 9 | PC(3) | | 600 | 0 | 100 | 2,000 | F | Δ-○ | NB |

Examples 11 and 12 and Comparative Example 12

As the polycarbonate resins (a) and (b), BPC homopolymer (PC(11)) and BPA homopolymer (PC(12)), respectively, in a ratio as identified in Table 11 were melt-kneaded by a twin screw extruder (LABOTEX 30HSS-32) manufactured by Japan Steel Works, Ltd. having one vent port, extruded in the form of strands from the outlet of the twin screw extruder, solidified by cooling with water, and pelletized by extruder (manufactured by Soken Industries Co., Ltd.) for the surface layer (A) and in a ϕ30 mm single screw extruder (manufactured by Soken Industries Co., Ltd.) for the resin layer (B), extruded from a double layer T die attached to the forward ends of both single screw extruders, and cooled by a roll to obtain a laminate of polycarbonate resins. Here, the molding temperature at the time of extrusion molding and the roll temperature are as identified in Table 11. Further, various evaluations were carried out in the same manner as in Example 11. The results are shown in Table 11.

TABLE 11

| | Surface layer (A) | | | | | | Resin layer (B) | | | Preparation conditions for laminate | | |
|---|---|---|---|---|---|---|---|---|---|---|---|---|
| | Polycarbonate resin (a) | | Polycarbonate resin (b) | | Mass ratio of polycarbonate resin (a) to polycarbonate resin (b) (a)/(b) | Thickness (μm) | Polycarbonate resin (c) | | Thickness (μm) | Molding temperature (° C.) | Roll temperature (° C.) | Thickness (μm) |
| | Type | Amount (wt %) | Type | Amount (wt %) | | | Type | Amount (wt %) | | | | |
| Ex. 11 | PC(11) | 90 | PC(12) | 10 | 90:10 | 100 | PC(12) | 100 | 400 | 280 | 130 | 500 |
| Ex. 12 | PC(11) | 50 | PC(12) | 50 | 50:50 | 100 | PC(12) | 100 | 400 | 280 | 135 | 500 |
| Comp. Ex. 11 | PC(11) | 100 | — | — | 100:0 | 100 | PC(12) | 100 | 400 | 280 | 130 | 500 |
| Comp. Ex. 12 | PC(11) | 10 | PC(12) | 90 | 10:90 | 100 | PC(12) | 100 | 400 | 280 | 142 | 500 |

| | Evaluation results | | |
|---|---|---|---|
| | Pencil hardness | Solution YI | Dupont impact strength (J) |
| Ex. 11 | 2H | 3.7 | 34 |
| Ex. 12 | H | 4.1 | 20.1 |
| Comp. Ex. 11 | 2H | 4.3 | 2.6 |
| Comp. Ex. 12 | HB | 3.4 | 18 |

From the foregoing results, it is evident that the polycarbonate resin sheet of the present invention has a pencil hardness of at least H as stipulated in ISO 15184 and yet has a suitable color with a low solution YI, and at the same time, it has a high Dupont impact resistance and is excellent in impact resistance.

Examples 21 to 24 and Comparative Examples 21 and 22

As the polycarbonate resins (a) and (b), BPC homopolymer (PC(21)), PC(22) or PC(25), BPC/BPA copolymer (PC(24) and BPA homopolymer (PC(23)) in a ratio as identified in Table 21 were melt-kneaded by a twin screw extruder (LABOTEX 30HSS-32) manufactured by Japan Steel Works, Ltd. having one vent port, extruded in the form of strands from the outlet of the twin screw extruder, solidified by cooling with water, and pelletized by a rotary cutter to obtain polycarbonate resin pellets. At that time, the resin temperature during the melt-kneading was as identified in Table 21. Further, butyl p-toluene sulfonate and Irganox 1076 were added in the proportions as identified in Table 21. Further, at the time of melt-kneading, the vent port of the twin screw extruder was connected to a vacuum pump, and the pressure at the vent port was controlled to be 500 Pa.

Then, the obtained polycarbonate resin pellets were extruded at an extrusion temperature of 280° C. by a φ25 mm single screw extruder (manufactured by Isuzu Kakoki Co., Ltd.) having a single layer T die attached to its forward end, and cooled by a roll of 90° C. to obtain a polycarbonate resin single layer sheet for a surface layer having a thickness of 200±10 μm and as identified in Table 21. The number of foreign matters of at least 300 μm in such a polycarbonate resin sheet for a surface layer was counted, and the results are shown in Table 21.

Then, the obtained polycarbonate resin single layer sheet for a surface layer was bonded to the inside of a mold having a size of 100 mm×100 mm and a thickness of 2 mm, and using an injection molding machine (J50E2, manufactured by The Japan Steel Works, Ltd.), a polycarbonate resin laminate was injection-molded under conditions of a barrel temperature of 280° C. and a mold temperature of 90° C. The composition of the core layer at that time was as identified in Table 21. With respect to the obtained polycarbonate resin laminate, the pencil hardness, the solution YI, the Dupont impact strength, etc. were evaluated in accordance with the methods described in the above evaluation items. The results are shown in Table 22.

TABLE 21

| | Surface layer (A) | | | | | | | | | |
|---|---|---|---|---|---|---|---|---|---|---|
| | PC(21) Amount (wt %) | PC(22) Amount (wt %) | PC(23) Amount (wt %) | PC(24) Amount (wt %) | PC(25) Amount (wt %) | Butyl p-toluene sulfonate Amount (wt %) | Irganox 1076 Amount (wt %) | Resin temperature during melt-kneading (° C.) | Thickness (μm) | Foreign matters of at least 300 μm in polycarbonate resin sheet Number/m² |
| Ex. 21 | 75 | — | 25 | — | — | — | — | 280 | 200 | 600 |
| Ex. 22 | — | 75 | 25 | — | — | 0.001 | — | 280 | 200 | 850 |
| Ex. 23 | — | 75 | 25 | — | — | 0.001 | 0.1 | 280 | 200 | 420 |
| Ex. 24 | — | 75 | 25 | — | — | 0.001 | 0.1 | 320 | 200 | 580 |
| Comp. Ex. 21 | — | — | — | 100 | — | 0.001 | — | 280 | 200 | 780 |

TABLE 21-continued

| | | | | | | | | | |
|---|---|---|---|---|---|---|---|---|---|
| Comp. Ex. 22 | — | — | — | — | 100 | — | — | 280 | 200 | At least 5,000 |

| | Resin layer (B) | | | | | | |
|---|---|---|---|---|---|---|---|
| | PC(21) Amount (wt %) | PC(22) Amount (wt %) | PC(23) Amount (wt %) | PC(24) Amount (wt %) | PC(25) Amount (wt %) | Irganox 1076 Amount | Thickness (μm) |
| Ex. 21 | 10 | — | 90 | — | — | — | 1,800 |
| Ex. 22 | — | 10 | 90 | — | — | — | 1,800 |
| Ex. 23 | — | 10 | 90 | — | — | 0.1 | 1,800 |
| Ex. 24 | — | 10 | 90 | — | — | 0.1 | 1,800 |
| Comp. Ex. 21 | — | — | 90 | 10 | — | — | 1,800 |
| Comp. Ex. 22 | — | — | 90 | — | 10 | — | — |

TABLE 22

Results of evaluation of polycarbonate resin laminate

| | Pencil hardness | Content of compound represented by formula (10) (ppm) | Content of compound represented by formula (8) (ppm) | Content of compound represented by formula (9) (ppm) | Solution YI | Foreign matters of at least 300 μm Number/m$^2$ | Dupont impact strength (J) |
|---|---|---|---|---|---|---|---|
| Ex. 21 | 2H | 2 | 1 | 66 | 3.2 | 820 | 36 |
| Ex. 22 | 2H | 44 | 9 | 275 | 3.1 | 1,240 | NB |
| Ex. 23 | 2H | 35 | 7 | 198 | 2.9 | 830 | NB |
| Ex. 24 | 2H | 37 | 9 | 242 | 3.1 | 640 | NB |
| Comp. Ex. 21 | H | 51 | 13 | 290 | 3.8 | 970 | 36 |
| Comp. Ex. 22 | 2H | 192 | 264 | 1,730 | 4.0 | At least 5,000 | — |

From a comparison of Examples 21 to 24 and Comparative Example 21, it is evident that in Examples 21 to 24 wherein BPC homopolymer and BPA homopolymer were used, the pencil hardness and the Dupont impact strength are higher and the solution YI is better, than in Comparative Example 21 wherein BPC/BPA copolymer (PC(24)) was used. Further, from a comparison of Examples 21 to 24 and Comparative Example 22, it is evident that the amount of foreign matters is large in the polycarbonate resin molded product wherein PC(25) was used.

INDUSTRIAL APPLICABILITY

According to the present invention, it is possible to form a polycarbonate resin laminate which has a surface hardness substantially improved and is good in color and which is excellent also in impact resistance. Further, since it is excellent in surface hardness and color, and also good in impact resistance, the polycarbonate resin laminate of the present invention is useful for display device components or display device covers for e.g. cell phones, smart phones, PDA, portable DVD players, portable game machines, portable personal computer displays, tablet-form computers, various portable touch panels, etc., protective components such as shield covers for motorcycles, or mask for helmets, or in-car component such as decorative sheets for car audio systems, car navigation systems, etc., and thus, its applicability is high.

This application is a continuation of PCT Application No. PCT/JP2012/069604, filed on Aug. 1, 2012, which is based upon and claims the benefit of priority from Japanese Patent Application No. 2011-168506 filed on Aug. 1, 2011, Japanese Patent Application No. 2012-036053 filed on Feb. 22, 2012, Japanese Patent Application No. 2012-101700 filed on Apr. 26, 2012, Japanese Patent Application No. 2012-101701 filed on Apr. 26, 2012, and Japanese Patent Application No. 2012-101702 filed on Apr. 26, 2012. The contents of those applications are incorporated herein by reference in their entireties.

What is claimed is:

1. A polycarbonate resin laminate which comprises at least a surface layer (A) and a resin layer (B) and is characterized by satisfying the following conditions:
   (i) the surface layer (A) is a layer made of a polycarbonate resin composition which comprises a mixture of a polycarbonate resin (a) having at least structural units represented by the following formula (1) and a polycarbonate resin (b) having structural units different from the polycarbonate resin (a),
   (ii) the mass ratio of the polycarbonate resin (a) to the polycarbonate resin (b) in the surface layer (A) is within a range of from 45:55 to 99:1, and
   (iii) the pencil hardness of the polycarbonate resin laminate as specified by ISO 15184 and measured from the surface layer (A) side is at least H

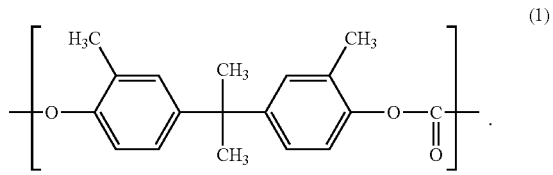

wherein the polycarbonate resin (b) has at least structural units represented by the following formula (2):

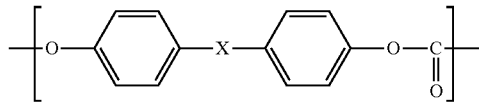

in the formula (2), X represents

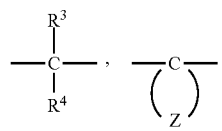

wherein each of $R^3$ and $R^4$ which are independent of each other, is a hydrogen atom or a methyl group, and Z is a group forming, as bonded to C, a $C_{6-12}$ alicyclic hydrocarbon which may have a substituent.

2. The polycarbonate resin laminate according to claim 1, wherein the resin layer (B) is made of a polycarbonate resin composition which contains at least the polycarbonate resin (b).

3. The polycarbonate resin laminate according to claim 2, wherein the resin layer (B) is made of a polycarbonate resin composition which further contains the polycarbonate resin (a), and in the resin layer (B), the proportion of the polycarbonate resin (a) is from 30 to 1 mass %, and the proportion of the polycarbonate resin (b) is from 70 to 99 mass %.

4. The polycarbonate resin laminate according to claim 1, wherein the polycarbonate resin (a) contains structural units derived from a compound represented by the following formula (8), and a content of such structural units is at least 20 ppm and at most 1,000 ppm:

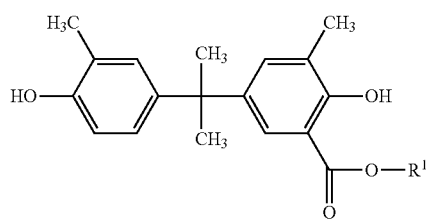

in the formula (8), $R^1$ is a hydrogen atom or a methyl group.

5. The polycarbonate resin laminate according to claim 4, wherein a content of the structural units derived from the compound represented by the formula (8) in the polycarbonate resin laminate is from 0.05 to 1,000 ppm.

6. The polycarbonate resin laminate according to claim 1, wherein the polycarbonate resin (a) contains structural units derived from a compound represented by the following formula (9), and a content of such structural units is at least 10 ppm and at most 3,500 ppm

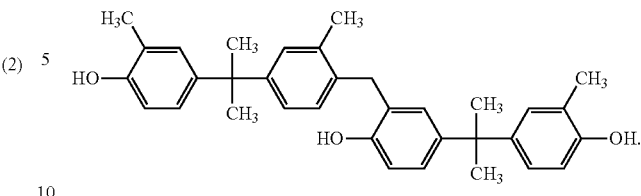

7. The polycarbonate resin laminate according to claim 6, wherein a content of the structural units derived from the compound represented by the formula (9) in the polycarbonate resin laminate is from 0.02 to 3,500 ppm.

8. The polycarbonate resin laminate according to claim 1, wherein the polycarbonate resin (a) contains structural units derived from a compound represented by the following formula (10), and a content of such structural units is at least 40 ppm and at most 600 ppm

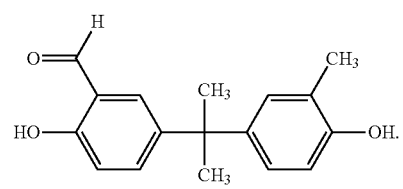

9. The polycarbonate resin laminate according to claim 8, wherein a content of the structural units derived from the compound represented by the formula (10) in the polycarbonate resin laminate is from 0.1 to 600 ppm.

10. The polycarbonate resin laminate according to claim 1, wherein the thickness of the polycarbonate resin laminate is from 200 to 5,000 μm.

11. The polycarbonate resin laminate according to claim 1, wherein the thickness of the surface layer (A) is from 20 to 1,000 μm, and the thickness of the resin layer (B) is from 10 to 5,000 μm.

12. The polycarbonate resin laminate according to claim 1, wherein a yellowness index is at most 10 when a 7 mass % solution of the polycarbonate resin laminate in methylene chloride is measured in an optical path length of 50 mm.

13. The polycarbonate resin laminate according to claim 1, wherein the polycarbonate resin composition constituting the surface layer (A) and/or the resin layer (B) contains at least one stabilizer selected from the group consisting of a phosphorus type stabilizer, a phenol type stabilizer and a sulfur type stabilizer in an amount of from 0.01 to 1 part by mass.

14. The polycarbonate resin laminate according to claim 13, wherein the stabilizer is a phenol type stabilizer.

15. A protective window material for a portable display device, a component for a display device, a cover for a display device, a component for a protective equipment or an in-vehicle component made of the polycarbonate resin laminate as defined in claim 1.

16. The polycarbonate resin laminate according to claim 1, wherein the polycarbonate resin (a) contains structural units derived from a compound represented by the following formula (10), and a content of such structural units is at least 40 ppm and at most 600 ppm:

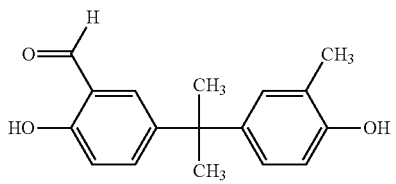 (10)
and wherein the content of the structural units derived from the compound represent ed by the formula (10) in the polycarbonate resin laminate is from 0.1 to 600 ppm.
* * * * *